United States Patent
Nagato et al.

(10) Patent No.: US 10,489,710 B2
(45) Date of Patent: Nov. 26, 2019

(54) PROGRAM GENERATION APPARATUS AND PROGRAM GENERATION METHOD

(71) Applicant: FUJITSU LIMITED, Kawasaki-shi, Kanagawa (JP)

(72) Inventors: Tsuyoshi Nagato, Isehara (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 15/801,842

(22) Filed: Nov. 2, 2017

(65) Prior Publication Data

US 2018/0144249 A1   May 24, 2018

Related U.S. Application Data

(63) Continuation of application No. PCT/JP2015/068371, filed on Jun. 25, 2015.

(51) Int. Cl.
*G06N 3/12* (2006.01)
*G06F 9/44* (2018.01)
(Continued)

(52) U.S. Cl.
CPC .............. *G06N 3/126* (2013.01); *G06F 8/36* (2013.01); *G06F 9/44* (2013.01); *G06K 9/00973* (2013.01);
(Continued)

(58) Field of Classification Search
CPC .. G06N 3/12; G06N 3/126; G06F 8/36; G06F 9/44; G06K 9/00973; G06K 9/00993;
(Continued)

(56) References Cited

U.S. PATENT DOCUMENTS 8,483,499 B2 * 7/2013 Kimura ................... G06K 9/48
382/162
8,761,496 B2 * 6/2014 Kokumai ................ H04N 5/91
382/155

(Continued)

FOREIGN PATENT DOCUMENTS

| JP | 2011-14049 | 1/2011 |
| WO | WO 2009/139161 A1 | 11/2009 |
| WO | WO 2014/104151 A1 | 7/2014 |

OTHER PUBLICATIONS

"Impulse noise filtering based on noise-free pixels using genetic programming", Abdul Majid, Knowledge & Information Systems; Sep. 2012, vol. 32 Issue 3, pp. 505-526 (Year: 2012).*

(Continued)

*Primary Examiner* — Michael S Osinski
(74) *Attorney, Agent, or Firm* — Staas & Halsey LLP

(57) ABSTRACT

In a program generation apparatus, a processing unit selects a first program from among a plurality of image processing programs each generated by combining a plurality of partial programs; generates a second program by changing a part of the partial programs included in the first program; performs image processing on an input image, using the second program; determines whether to pass the second program to the next generation, based on a comparison between one or more intermediate output images that are output halfway through the image processing and a first target image; and replaces one of the image processing programs with the second program when the second program is determined to be passed to the next generation.

7 Claims, 16 Drawing Sheets

(51) Int. Cl.
*G06T 5/20* (2006.01)
*G06T 7/00* (2017.01)
*G06F 8/36* (2018.01)
*G06K 9/00* (2006.01)
*G06K 9/62* (2006.01)

(52) U.S. Cl.
CPC ....... *G06K 9/00993* (2013.01); *G06K 9/6202* (2013.01); *G06K 9/6256* (2013.01); *G06N 3/12* (2013.01); *G06T 5/20* (2013.01); *G06T 7/00* (2013.01)

(58) Field of Classification Search
CPC ...... G06K 9/6202; G06K 9/6256; G06T 5/20; G06T 5/50; G06T 5/001; G06T 7/00; G06T 7/194; H04N 1/6052; H04N 1/2137–2145; H04N 2201/3242
See application file for complete search history.

(56) References Cited

U.S. PATENT DOCUMENTS

| | | | | |
|---|---|---|---|---|
| 9,171,264 | B2* | 10/2015 | Finocchio | G06N 5/046 |
| 9,805,282 | B2* | 10/2017 | Mase | G06K 9/4671 |
| 9,826,209 | B2* | 11/2017 | Koizumi | A61B 1/04 |
| 10,303,447 | B2* | 5/2019 | Nagato | G06F 9/44 |
| 2008/0069399 | A1* | 3/2008 | Nagao | G06T 7/215 |
| | | | | 382/103 |
| 2009/0297044 | A1 | 12/2009 | Kokumai et al. | |
| 2010/0277774 | A1* | 11/2010 | Reid | G06T 7/0002 |
| | | | | 358/474 |
| 2010/0328688 | A1* | 12/2010 | Sakamoto | H04N 1/6052 |
| | | | | 358/1.9 |
| 2011/0122254 | A1* | 5/2011 | Ishii | G02B 27/646 |
| | | | | 348/169 |
| 2012/0098987 | A1* | 4/2012 | Tsuda | H04N 1/2141 |
| | | | | 348/222.1 |
| 2014/0086506 | A1* | 3/2014 | Ichikawa | G06T 5/005 |
| | | | | 382/264 |
| 2015/0287160 | A1 | 10/2015 | Nagato et al. | |
| 2016/0098615 | A1* | 4/2016 | Nagato | G06N 3/126 |
| | | | | 382/141 |
| 2016/0110168 | A1* | 4/2016 | Feder | G06F 8/34 |
| | | | | 717/106 |
| 2017/0006271 | A1* | 1/2017 | Koizumi | A61B 1/04 |
| 2017/0223075 | A1* | 8/2017 | Hong | G06F 8/65 |

OTHER PUBLICATIONS

Kazunari Minami et al., "Study on Multi-Stage Evolutionary Design for Image Processing Filters", IPSJ SIG Notes Mathematical Modeling and Problem Solving (MPS), Feb. 24, 2015, vol. 2015-MPS-102, No. 9, pp. 1-6 and Bibliographic pp. 1-2.

Shinya Aoki et al., "ACTIT: Automatic Construction of Tree-structural Image Transformations", The Journal of the Institute of Image Information and Television Engineers, vol. 53, No. 6, Jun. 20, 1999, pp. 888-894.

Japanese Platform for Patent Information English abstract for Japanese Patent Publication No. 2011-14049, published Jan. 20, 2011.

International Search Report dated Sep. 15, 2015, corresponding to International Patent Application No. PCT/JP2015/068371.

Aoki, et al., "Automatic Construction of Tree-structural Image Transformations Using Genetic Programming," Institute of Electrical and Electronics Engineers, 1999, XP010354352, pp. 136-141.

Bai, et al., "Efficient Evolutionary Image Processing Using Genetic Programming: Reducing computation time for generating feature images of the Automatically Construction of Tree-Structural Image Transformation (ACTIT)," 10th International conference on Intelligent Systems Design and Applications, Institute of Electrical and Electronics Engineers, 2010, XP031848965, pp. 302-307.

Fu, et al., "Genetic Programming for Edge Detection Using Blocks to Extract Features," Genetic and Evolutionary Computation Conference, Jul. 7-11, 2012, XP058041880, pp. 855-862.

Extended European Search Report dated Jun. 15, 2018, in corresponding European Patent Application No. 15896359.5, 9 pgs.

* cited by examiner

FIG. 4
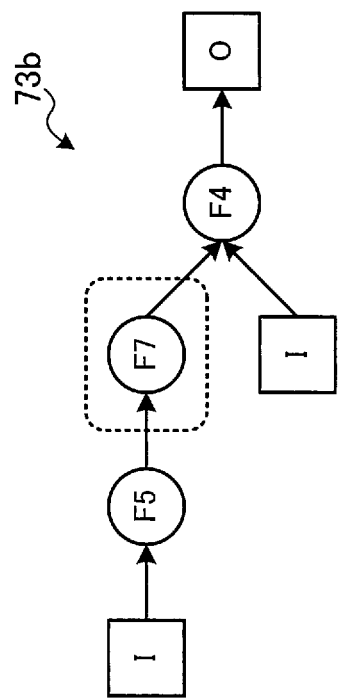
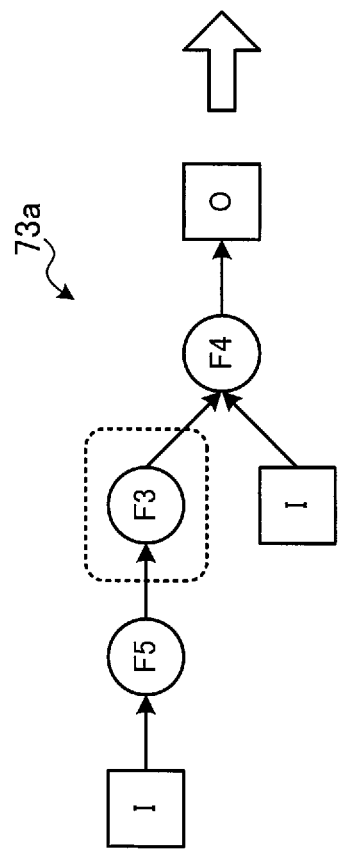

PROGRAM GENERATION APPARATUS AND PROGRAM GENERATION METHOD

CROSS-REFERENCE TO RELATED APPLICATION

This application is a continuation application of International Application PCT/JP2015/068371 filed on Jun. 25, 2015 which designated the U.S., the entire contents of which are incorporated herein by reference.

FIELD

The embodiments discussed herein relate to a program generation apparatus and a program generation method.

BACKGROUND

A technology for automatically generating an image processing program that performs desired image processing, by using genetic programming, is drawing attention. This technology is designed to optimize an image processing program that is generated by combining partial programs for image processing (for example, image filtering programs), based on learning data such as pairs of an input image and an image obtained as a result of processing (a target image), by using genetic programming.

As an example of an apparatus using genetic programming, there has been proposed a genetic processing apparatus that evolves a converter, using weight data of the current generation and weight data of the previous generations.

See, for example, the following documents:
Japanese Laid-Open Patent Publication No. 2011-14049; and
Shinya Aoki and Tomoharu Nagao, "ACTIT: Automatic Construction of Tree-structural Image Transformations", The Journal of The Institute of Image Information and Television Engineers, Vol. 53, No. 6, Jun. 20, 1999, pp. 888-894.

In the process of automatically generating an image processing program by using genetic programming, the following survival selection method is used, for example. That is, an input image included in learning data is processed with a program corresponding to an individual generated in the course of learning. An output data that is output as the processing result is compared with a target image included in the learning data. Then, a determination is made as to whether to pass the individual to the next generation, based on the comparison result.

However, a problem with this method is that an effective individual that promotes learning may be eliminated depending on the content of image processing. This problem may result in an increase in time taken to generate an image processing program.

SUMMARY

According to one aspect, there is provided a program generation apparatus that generates a program by using genetic programming, the program generation apparatus including: a memory configured to store learning data including an input image and a first target image, the first target image indicating an image that is output halfway through a process of converting the input image into a second target image; and a processor configured to perform a procedure including: selecting a first program from among a plurality of image processing programs each generated by combining a plurality of partial programs, generating a second program by changing a part of the partial programs included in the first program, performing image processing on the input image using the second program, determining whether to pass the second program to a next generation, based on a comparison between one or more intermediate output images and the first target image, the one or more intermediate output images being output halfway through the image processing, and replacing one of the plurality of image processing programs with the second program when the second program is determined to be passed to the next generation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a mutation;

DESCRIPTION OF EMBODIMENTS

Several embodiments will be described below with reference to the accompanying drawings.

First Embodiment

Figure 1:
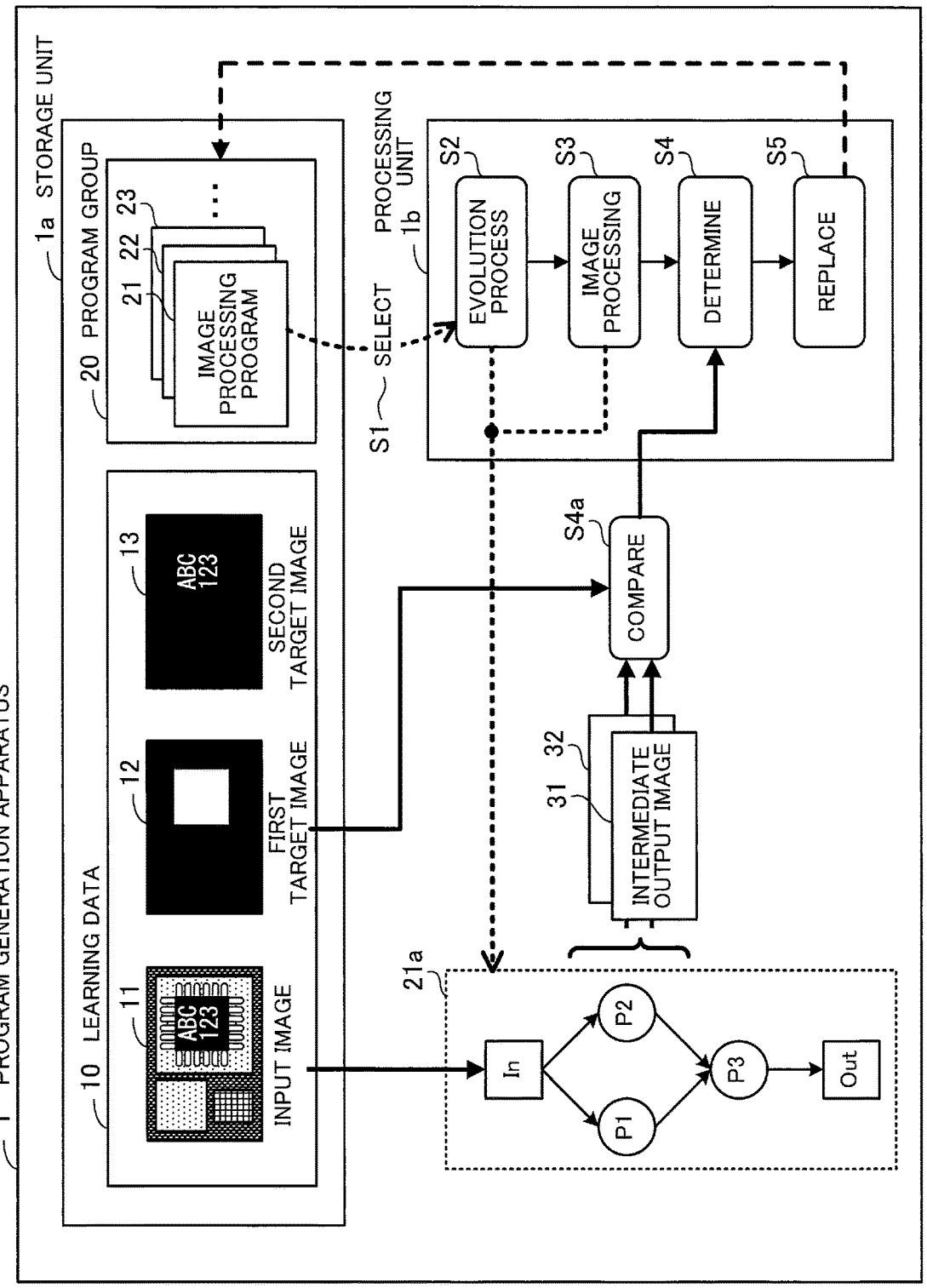
FIG. 1 illustrates an exemplary configuration and operation of a program generation apparatus according to a first embodiment.

FIG. 1 illustrates an exemplary configuration and operation of a program generation apparatus according to a first embodiment. A program generation apparatus 1 is an apparatus that generates an image processing program by using genetic programming.

The program generation apparatus 1 includes a storage unit 1a and a processing unit 1b. The storage unit 1a is implemented, for example, as a volatile storage device such as random access memory (RAM) and the like, or a non-volatile storage device such as hard disk drive (HDD), flash memory, and the like. The processing unit 1b is, for example, a processor.

The storage unit 1a stores learning data 10. The learning data 10 includes an input image 11, a first target image 12, and a second target image 13. The second target image 13 is a target image for an image that is output as the processing result of image processing performed on the input image 11. Meanwhile, the first target image 12 is a target image for an image that is output at a certain step halfway through image processing performed for converting the input image 11 into the second target image 13. For example, in the case of image processing that performs certain processing on a specific image region of the input image 11, the first target image 12 may be an image in which a specific image region of the image is distinguished from the other image region (background region). The image regions may be distinguished by, for example, assigning pixel values, such as setting the pixel value of the specific image region to a maximum value and setting the pixel value of the background region to a minimum value (0).

Note that the storage unit 1a may store a plurality of sets of learning data 10.

Further, the storage unit 1a may store a program group 20. The program group 20 is data used for operations performed by the processing unit 1b, and includes a plurality of image processing programs 21, 22, 23, and so on. Each of the image processing programs 21, 22, 23 and so on included in the program group 20 is generated by combining a plurality of partial programs. A partial program is a program component for performing image processing such as image filtering and the like. Every time a new generation of the program group 20 is created, the program generation apparatus 1 preferentially preserves an image processing program with a high fitness value in the program group 20, and thereby generates an image processing program that performs desired image processing.

The processing unit 1b selects an image processing program from the program group 20 (step S1). Here, for example, an image processing program 21 is selected. Then, the processing unit 1b generates an image processing program 21a by changing a part of the partial programs included in the selected image processing program 21. This processing process is a process of evolving the image processing program 21 (step S2). This evolution process involves, for example, a crossover between the image processing program 21 and another image processing program selected from the program group 20, a mutation of the image processing program 21 or the program resulting from the crossover, and the like.

As the result of the evolution process, the image processing program 21a is generated by combining partial programs P1 to P3, for example. Note that in FIG. 1, "In" indicates an input part of the image processing program 21a, and "Out" indicates an output part of the image processing program 21a.

Then, the processing unit 1b performs image processing on the input image 11, using the image processing program 21a (step S3). The processing unit 1b outputs intermediate output images halfway through this image processing. For example, the intermediate output images are images that are respectively output as the processing results of the partial programs P1 and P2, other than the partial program P3 incorporated in the final stage, from among the partial programs P1 to P3 of the image processing program 21a. In the example of FIG. 1, an intermediate output image 31 is output as the processing result of the partial program P1, and an intermediate output image 32 is output as the processing result of the partial program P2.

Then, the processing unit 1b determines whether to pass the generated image processing program 21a to the next generation (step S4). The operation of step S4 includes an operation (step S4a) of comparing the intermediate output images 31 and 32 with the first target image 12. In step S4a, for example, the similarity between the images is output as the comparison result. Further, as in the example of FIG. 1, in the case where the plurality of intermediate output images 31 and 32 are compared with the first target image 12 in step S4a, the maximum value among the similarities of the intermediate output images 31 and 32 to the first target image 12 is output as the comparison result, for example. Based on the comparison result of step S4a, the processing unit 1b determines whether to pass the image processing program 21a to the next generation.

Note than in step S4, the determination may be made based not only on the comparison result of step S4a, but also on the comparison result between a final output image, which is output as the execution result of the image processing program 21a, and the second target image 13.

If, in step S4, the image processing program 21a is determined to be passed to the next generation, the processing unit 1b replaces one of the image processing programs 21, 22, 23, and so on of the program group 20 with the image processing program 21a (step S5). Thus, a new generation of the program group 20 is created.

One method of determining as to whether to pass the image processing program 21a to the next generation may be to make a determination based on a comparison between the final output image, which is output as the result of image processing by the image processing program 21a, and the second target image 13. However, with this method, even in the case where an image close to the desired image such as the first target image 12 is generated halfway through the image processing, if the final output image is not similar to the second target image 13, the image processing program 21a is eliminated and not passed to the next generation of the program group 20. That is, an effective image processing program that is likely to contribute to promoting learning is eliminated. This may result in an increase in time taken to complete generation of an image processing program.

Meanwhile, the comparison result in step S4a represents the index indicating how close the intermediate output image that is output halfway through execution of the image processing program 21a is to the desired image. Since a determination is made based on this index in step S4, when the image processing program 21a is likely to be able to output an appropriate image halfway through execution of the image processing program 21a, the image processing program 21a is passed to the next generation of the program group 20 without being eliminated. Thus, appropriate survival selection is performed such that an image processing program whose processing process is specified as being appropriate is more likely to be passed to the next generation.

Then, the operations of steps S1 to S5 are repeatedly executed using the new generation of the program group 20 that is created by the procedure described above. Thus, the speed of increase in the similarity between images indicated by the comparison result of step S4a is increased, so that the learning speed is improved. This reduces the time taken for the maximum value among the fitness values of the image processing programs included in the program group 20 and the image processing programs generated from these image processing programs through the evolution process to reach a predetermined threshold. That is, the time taken to generate an image processing program that implements desired processing is reduced.

Second Embodiment

Next, an image processing apparatus according to a second embodiment will be described. The image processing apparatus according to the second embodiment has the processing functions similar to those of the program generation apparatus 1 of FIG. 1, and also has a function of performing image processing by executing an image processing program generated by these functions.

In the following, a comparative example of a basic procedure for an image processing program generation process by using genetic programming will first be described with reference to FIGS. 2 to 4. A problem with the comparative example will then be described with reference to FIG. 5. After that, the image processing apparatus according to the second embodiment will be described.

Figure 2:
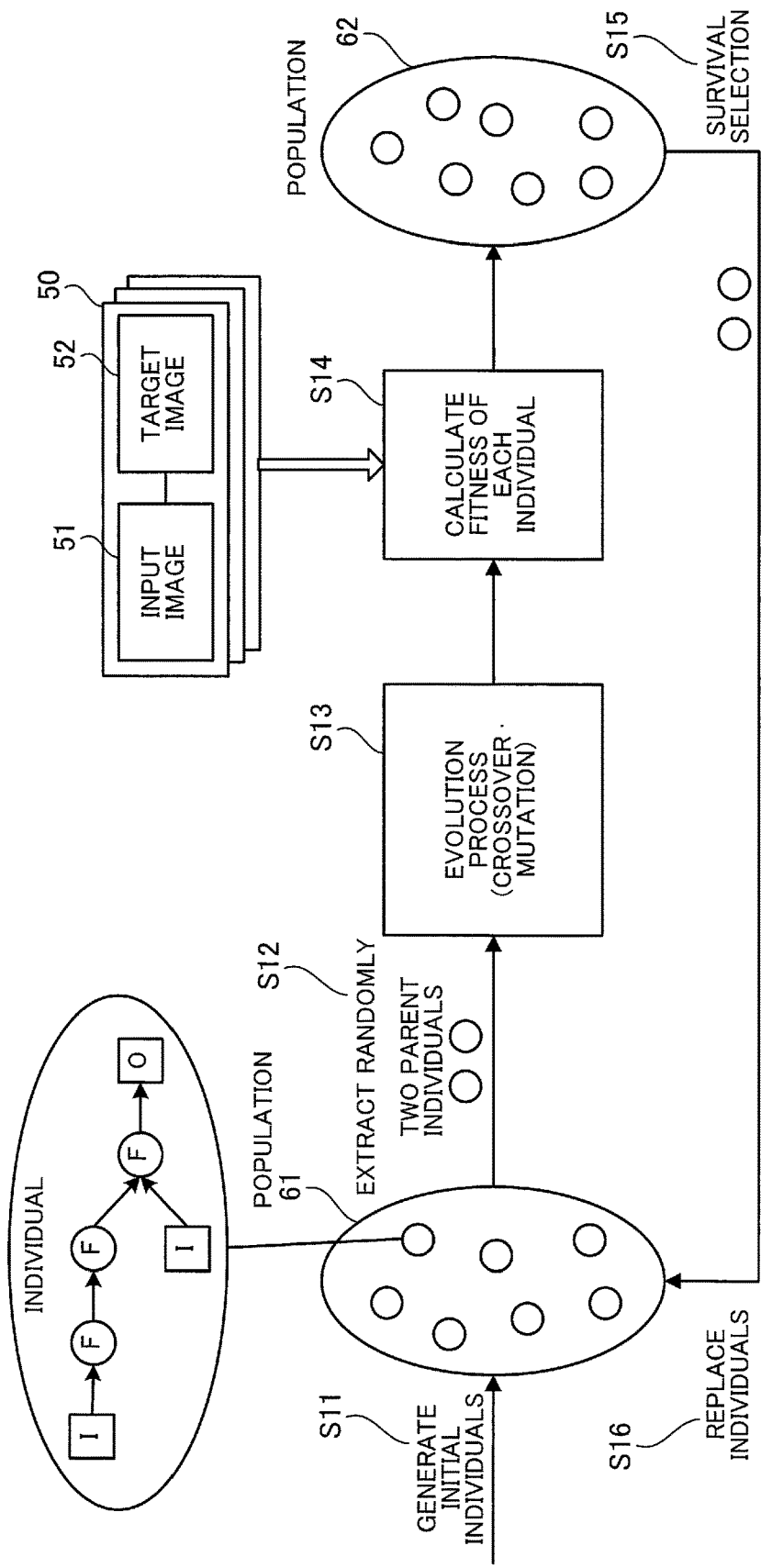
FIG. 2 illustrates a comparative example of a procedure for an image processing program generation process.

FIG. 2 illustrates a comparative example of a procedure for an image processing program generation process.

Before starting an image processing program generation process, at least one set of learning data 50 is prepared. The learning data 50 includes an input image 51 and a target image 52 that is obtained by performing image processing on the input image 51. The input image 51 may be obtained, for example, by capturing an image of an object with a camera.

In the image processing program generation process using genetic programming, an individual is formed by combining one or more partial programs. For example, as illustrated in the upper left of FIG. 2, an individual is defined by a tree structure.

A plurality of partial programs that may be incorporated into an individual are also prepared in advance. In the following description, image filters are used as an example of partial programs that are incorporated into an individual. However, the partial programs are not limited to image filters, and programs for performing other types of image processing may be used. Note that in the upper left of FIG. 2, "F" represents an image filter; "I" represents an input terminal; and "O" represents an output terminal.

The image processing program generation process using genetic programming is performed, for example, in the following manner. First, a population 61 including a plurality of initial individuals is generated (step S11). Image filters are randomly selected from among a plurality of image filters prepared in advance and incorporated into the nodes of each initial individual. Then, two parent individuals are randomly extracted from the generated population 61 (step S12).

Subsequently, the two parent individuals undergo an evolution process, so that two or more child individuals are generated (step S13). In the evolution process, a crossover operation and a mutation operation are performed on the two parent individuals. Three or more child individuals may be generated by performing different crossover operations and mutation operations on the two parent individuals.

Then, a fitness value is calculated for each of the child individuals generated through the evolution process and the original parent individuals (step S14). In this operation, image processing using each of these individuals is performed on the input image 51 of the learning data 50. Then, an image obtained from the image processing is compared with a corresponding target image 52 to thereby calculate a fitness value of the individual. In the case where there are a plurality of sets of learning data 50, the average of fitness values that are obtained using the plurality of sets of learning data 50 is calculated for each individual.

If the fitness value of any of the individuals is greater than or equal to a predetermined threshold, the individual is output as a final image processing program. Then, the image processing program generation process ends. On the other hand, if the fitness values of all the individuals are less than the predetermined threshold, survival selection is performed on a population 62 including the generated child individuals and the two original parent individuals (step S15). In the survival selection, an individual with the highest fitness value is selected from the population 62. Further, one individual is selected from among the remaining individuals of the population 62 by using a predetermined method. For example, one individual is selected from among the remaining individuals in accordance with the probabilities based on their fitness values.

The two individuals selected by the survival selection replace two individuals included in the population 61 (step S16). For example, the two individuals selected by the survival selection replace the two individuals extracted as the parent individuals, among the individuals included in the population 61. Thus, the individuals included in the population 61 are changed to individuals of the next generation. Then, the same procedure is repeated until an individual with a fitness value greater than or equal to the predetermined threshold is produced.

Figure 3:
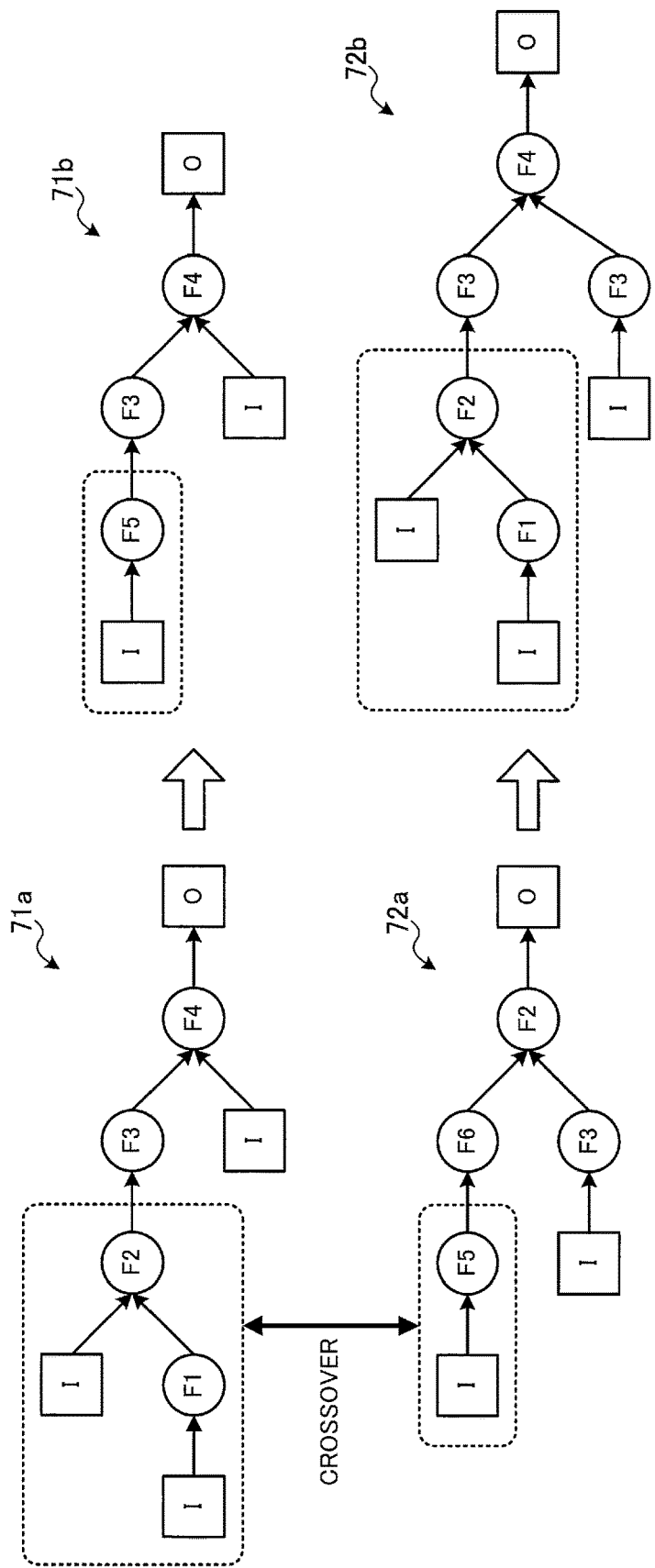
FIG. 3 illustrates an example of a crossover.

FIG. 3 illustrates an example of a crossover. In the example of FIG. 3, a crossover is performed between parent individuals 71a and 72a, thereby generating a child individual 71b derived from the parent individual 71a and a child individual 72b derived from the parent individual 72a.

The parent individual 71a includes image filters F1, F2, F3, and F4, and the parent individual 72a includes image filters F2, F3, F5, and F6. Assume here that the node of the image filter F2 in the parent individual 71a and the node of the image filter F5 in the parent individual 72a are selected to be subjected to a crossover.

In a crossover operation, for example, not only a selected node but also nodes at levels lower than the level of the selected node are subjected to a crossover. Accordingly, in the example of FIG. 3, a section of the parent individual 71a including "the image filters F2 and F1; a node of an input terminal connected to one end of the image filter F2; and a node of an input terminal connected to the image filter F1" is swapped with a section of the parent individual 72a including "the image filter F5; and a node of an input terminal connected to the image filter F5". As a result, the crossover produces the child individual 71b including the image filters F3, F4, and F5, and the child individual 72b including single image filters F1, F2, and F4 and two image filters F3.

FIG. 4 illustrates an example of a mutation. In FIG. 4, an individual 73a includes the image filters F3, F4, and F5. The individual 73a may be a parent individual extracted from the population 61, or an individual produced by performing a crossover on the parent individuals extracted from the population 61.

Assume here that the node of the image filter F3 in the individual 73a is selected as a site of mutation, and an image filter F7 is selected as a replacing image filter in the mutation operation. Note that the replacing image filter in the mutation operation is randomly selected from among a plurality of image filters prepared in advance. The mutation produces a child individual 73b including the image filters F4, F5, and F7.

Conceivable uses of an image processing program generated by the above procedure include, for example, achieving a desired effect by performing image processing on an image of a product in the factory automation (FA) field. Specifically, the image processing program may be used to perform image processing on an image of the appearance of a product to thereby extract sites with defects, extract points for alignment, or recognize characters printed on a specific component.

In such usage, reconstruction of an image processing algorithm is often needed due to alterations and improvements made to a product used as an imaging object, the associated changes in the imaging environment, and the like. Therefore, there is a demand for easy construction of an image processing algorithm. There is also a demand for construction of an image processing algorithm robust to changes in the imaging environment, such as changes in lighting conditions, variations in the shape, position, and orientation of the imaging object, and so on.

With use of genetic programming, it is possible to easily generate an image processing program usable for such applications, by simply preparing in advance the input image 51 and the target image 52 corresponding thereto. Further, it is possible to automatically generate an image processing algorithm robust to changes in the imaging environment, by preparing in advance a plurality of pairs of the input image 51 and the target image 52 (a plurality of sets of learning data 50) whose imaging environments are different from each other.

Figure 5:
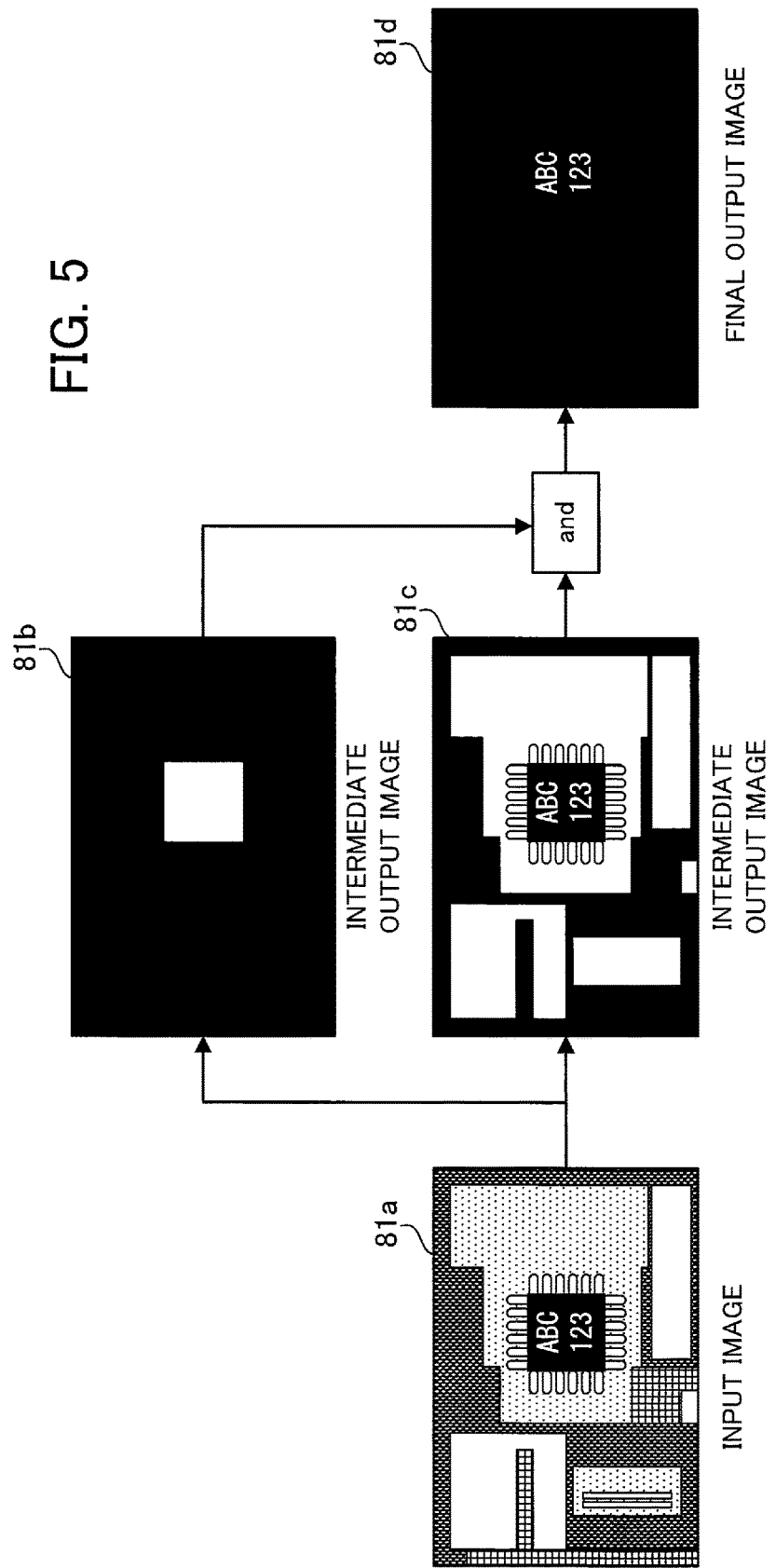
FIG. 5 illustrates an example of image processing.

FIG. 5 illustrates an example of image processing. The image processing includes, for example, performing certain processing on a specific region of an input image. As an example of such processing, FIG. 5 illustrates a process of extracting, from a package region of a semiconductor chip mounted on a printed circuit board, only the portion of text printed in that region as a region of a specific color (for example, white). In a final output image 81d that is finally output as the result of image processing, only the portion of text "ABC123" printed in a package region of a semiconductor chip is extracted as a white region.

Note that the image processing of FIG. 5 is performed as preprocessing for recognizing text in a specific region. Further, other examples of the process of performing certain processing on a specific region may include a process of extracting, from a region where a specific component is mounted, a portion of symbols or patterns drawn on the component as a region of a specific color. Other examples may also include a process of extracting, from a specific region in an image, only a region where a component is mounted as a region of a specific color, in order to detect the position and inclination of the component in the specific region.

In the following description, a specific region from which text, symbols, or patterns are extracted is referred to as an "extraction target region".

As for input images used in the image processing described above, the brightness of the object at the time of imaging may greatly vary from image to image. Moreover, the degree of variation in the brightness of the extraction target region in the image often differs from the degree of variation in the brightness of the background region other than the extraction target region. This is because the cause of variation in brightness may differ between the extraction target region and the background region. Possible causes include, for example, the difference in light reflectance and color tendency between the extraction target region and the background region, and the difference in how light is received from the surroundings due to the difference in height between the extraction target region and the background region.

Accordingly, it is highly difficult to create a preprocessing algorithm that reduces the effect of variation in brightness by performing processing on the entire image. In order to reduce the effect of variation in brightness, it is preferable to perform different types of preprocessing on the extraction target region and the background region. Therefore, in order to improve the robustness in the image processing described above, it is important to include a process of separating the extraction target region and the background region.

In an input image 81a illustrated in FIG. 5, the package region of the semiconductor chip is black, and therefore the luminance changes little with variation of illumination. However, the printed circuit board that is displayed as background has a lighter color, and therefore the luminance is likely to change greatly with variation of illumination. In the case where a programmer creates an image processing program that obtains the final output image 81d from the input image 81a containing such an object, an intermediate-processing algorithm that extracts the package region of a semiconductor chip is often included. According to this intermediate-processing algorithm, for example, an image is obtained in which an extracted region is distinguished from a background region other than the extracted region based on the pixel value or the like. Then, a region of text is extracted using the obtained image.

An example of an image in which an extracted region is distinguished from a background region other than the extracted region may be a mask image in which a background region other than an extracted region is masked. In a mask image, an extracted region is converted into a white region (that is, a region with the maximum pixel value), and a background region other than the extracted region is converted into a black region (that is, a region with the minimum pixel value).

An intermediate output image 81b of FIG. 5 is an example of a mask image generated by the intermediate-processing algorithm described above. This intermediate-processing algorithm is one that extracts a region of color similar to that of a package region of a semiconductor chip from the input image 81a, for example. Meanwhile, the image processing of FIG. 5 also includes, for example, a process of extracting, from the input image 81a, a region of a color similar to that of text to be extracted. An intermediate output image 81c of FIG. 5 is an example of an image obtained by this process. Then, in the image processing of FIG. 5, the final output image 81d is generated by performing a logical AND between the intermediate output image 81b and the intermediate output image 81c.

In the case where an image processing program that performs the image processing described above is generated by the procedure illustrated in FIG. 2, evaluation of an individual for survival selection (that is, calculation of fitness) is performed based on comparison between the final output image 81d and its corresponding target image. In this case, even if effective processing that extracts an extraction target region is performed halfway through the image processing using an individual, the individual may be eliminated in accordance with the evaluation result based on the final output image, regardless of whether such effective processing is performed. This causes a problem that an individual that has produced an effective output halfway through the image processing is not passed to the next generation.

This indicates that if survival selection of individuals is performed using only the evaluation result based on the final output image, it takes time for the value indicating the evaluation result to converge, which contributes to an increase in time taken to generate an image processing program. In other words, time taken to generate an image processing program is likely to be reduced by performing survival selection using the evaluation result that is based not only on the final output image, but also on the intermediate output image that is obtained halfway through the image processing.

Another method for solving the above problem may be to generate an image processing program after specifying a region of interest (ROI) corresponding to an extraction target region on the input image in advance. However, this method is applicable to only an image in which an extraction target region is located in a fixed position. Still another method may be to separately perform learning for a program that extracts a region of interest and learning for a program that performs subsequent operations. However, performing learning multiple times increases the overall time taken to generate a program.

Figure 6:
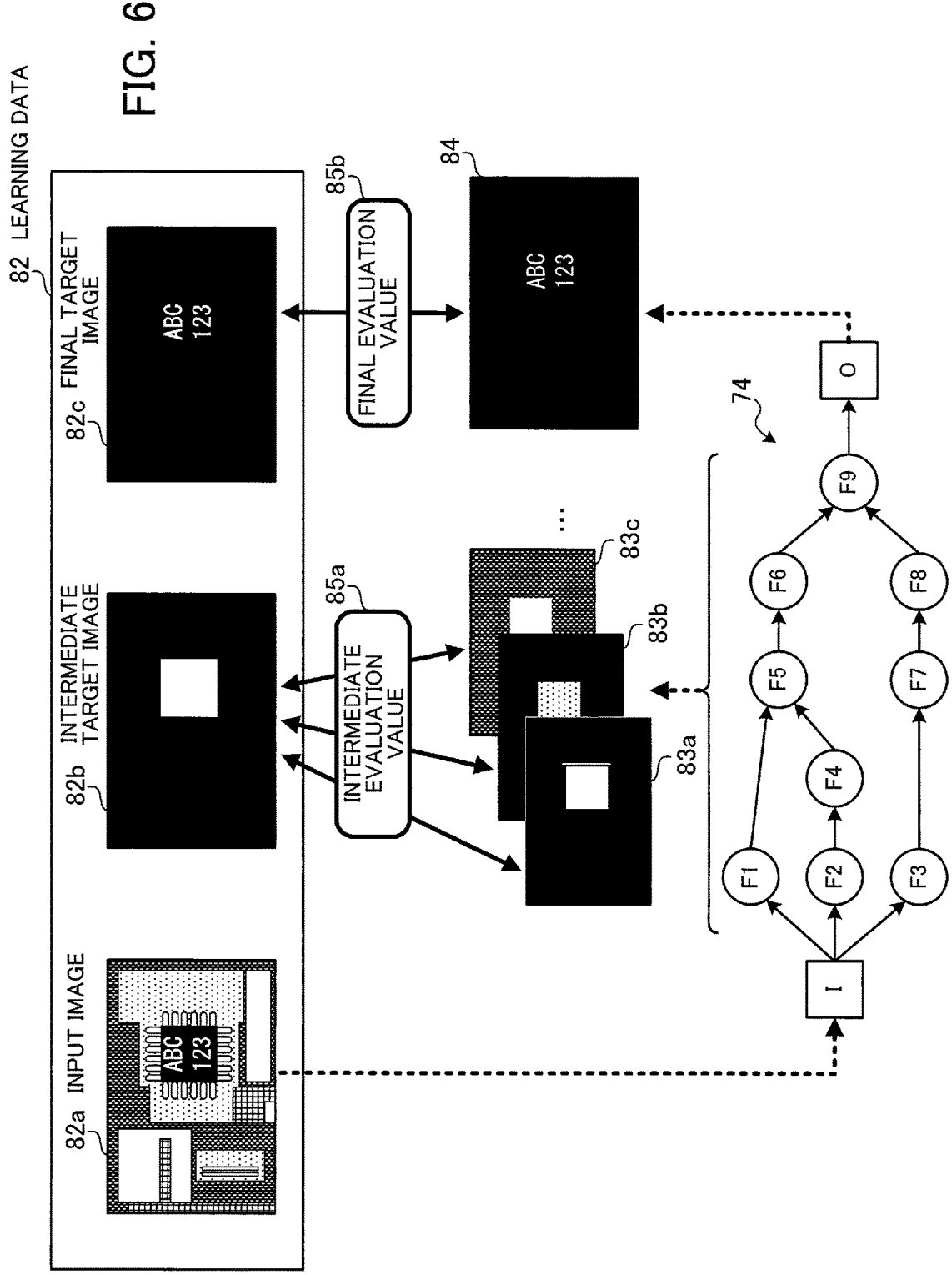
FIG. 6 illustrates the overview of the procedure for evaluation of an individual according to a second embodiment.

FIG. 6 illustrates the overview of the procedure for evaluation of an individual according to the second embodiment. The image processing apparatus of the present embodiment evaluates an individual with the procedure illustrated in FIG. 6.

In the present embodiment, a set of an input image 82a, an intermediate target image 82b, and a final target image 82c is prepared as learning data 82. The final target image 82c is a target image for an image that is finally output by image processing using an individual under evaluation. The intermediate target image 82b is a target image for an image that is output at a stage halfway through image processing using the individual under evaluation, that is, at any of the nodes of the individual excluding the final node of the individual. In the example of FIG. 6, the intermediate target image 82b is a mask image that masks the region (background region) other than the extraction target region.

In FIG. 6, an individual 74 including image filters F1 to F9 is illustrated as an example of an individual under evaluation. The image processing apparatus according to the present embodiment takes the input image 82a as an input, and performs image processing using the individual 74 under evaluation. Then, the image processing apparatus acquires output images that are output at the nodes each incorporating an image filter (a partial program) in the individual 74.

The acquired output images are roughly classified as follows: intermediate output images 83a, 83b, 83c, and so on that are output at the respective nodes (intermediate nodes) excluding the final node, and a the final output image 84 that is output at the final node. That is, the image processing apparatus acquires, as the intermediate output images 83a, 83b, 83c, and so on, output images that are output from the image filters F1 to F9 excluding the image filter F9 incorporated in the final node of the individual 74. Further, the image processing apparatus acquires, as the final output image 84, an output image that is from the image filter F9 incorporated in the final node of the individual 74 (that is, the final output image of the individual 74).

The image processing apparatus determines whether to pass the individual 74 to the next generation, based on the comparison result between the acquired final output image 84 and the final target image 82c, and the comparison result between each of the intermediate output images 83a, 83b, 83c, and so on and the intermediate target image 82b.

More specifically, the image processing apparatus compares the acquired final output image 84 with the final target image 82c, and calculates a final evaluation value 85b based on the comparison result. This calculation may be performed by the same method as that of step S14 of FIG. 2. Thus, for example, the similarity between the final output image 84 and the final target image 82c is calculated as the final evaluation value 85b.

Further, the image processing apparatus compares each of the acquired intermediate output images 83a, 83b, 83c, and so on with the intermediate target image 82b, and calculates an intermediate evaluation value 85a based on the comparison result. For example, the image processing apparatus calculates the similarity between each of the intermediate output images 83a, 83b, 83c, and so on and the intermediate target image 82b, and obtains the maximum value among the calculated similarities as the intermediate evaluation value 85a.

Then, the image processing apparatus determines whether to pass the individual 74 to the next generation, based on the intermediate evaluation value 85a and the final evaluation value 85b. For example, the image processing apparatus determines whether to pass the individual 74 to the next generation, based on an evaluation value obtained by synthesizing the intermediate evaluation value 85a and the final evaluation value 85b at a ratio corresponding to a weight coefficient.

With the procedure described above, an individual that generates not only a final output image close to a final target image but also an intermediate output image close to an intermediate target image is passed to the next generation. As the number of individuals whose intermediate output image is determined to be close to the intermediate target image increases as described above in the population 61 (see FIG. 2), the final evaluation values of the parent individuals and child individuals generated from the population 61 are more likely to increase, which promotes learning. Accordingly, the time taken to complete generation of an image processing program is reduced.

The image processing apparatus may use, as an evaluation value for determining whether to pass an individual to the next generation, a value calculated based on a weighted intermediate evaluation value and final evaluation value. For example, in the initial stage of learning, the image processing apparatus uses an evaluation value calculated with a greater weight assigned to the intermediate evaluation value. Then, as learning progresses, the image processing apparatus gradually increases the weight assigned to the final evaluation value for calculating the evaluation value. Accordingly, in the initial stage of learning, learning is performed with a focus on making the intermediate output image closer to the intermediate target image. Then, as learning progresses and the intermediate evaluation value converges, a greater focus is placed on making the final output image closer to the final target image. As the number of individuals having a high intermediate evaluation value increases in the population 61, the time taken for the final evaluation value to reach the predetermined threshold is reduced. Therefore, by varying the weight as described above, the time taken to complete generation of an image processing program is reduced as a whole.

In the following, the image processing apparatus according to the second embodiment will be described in detail.

Figure 7:
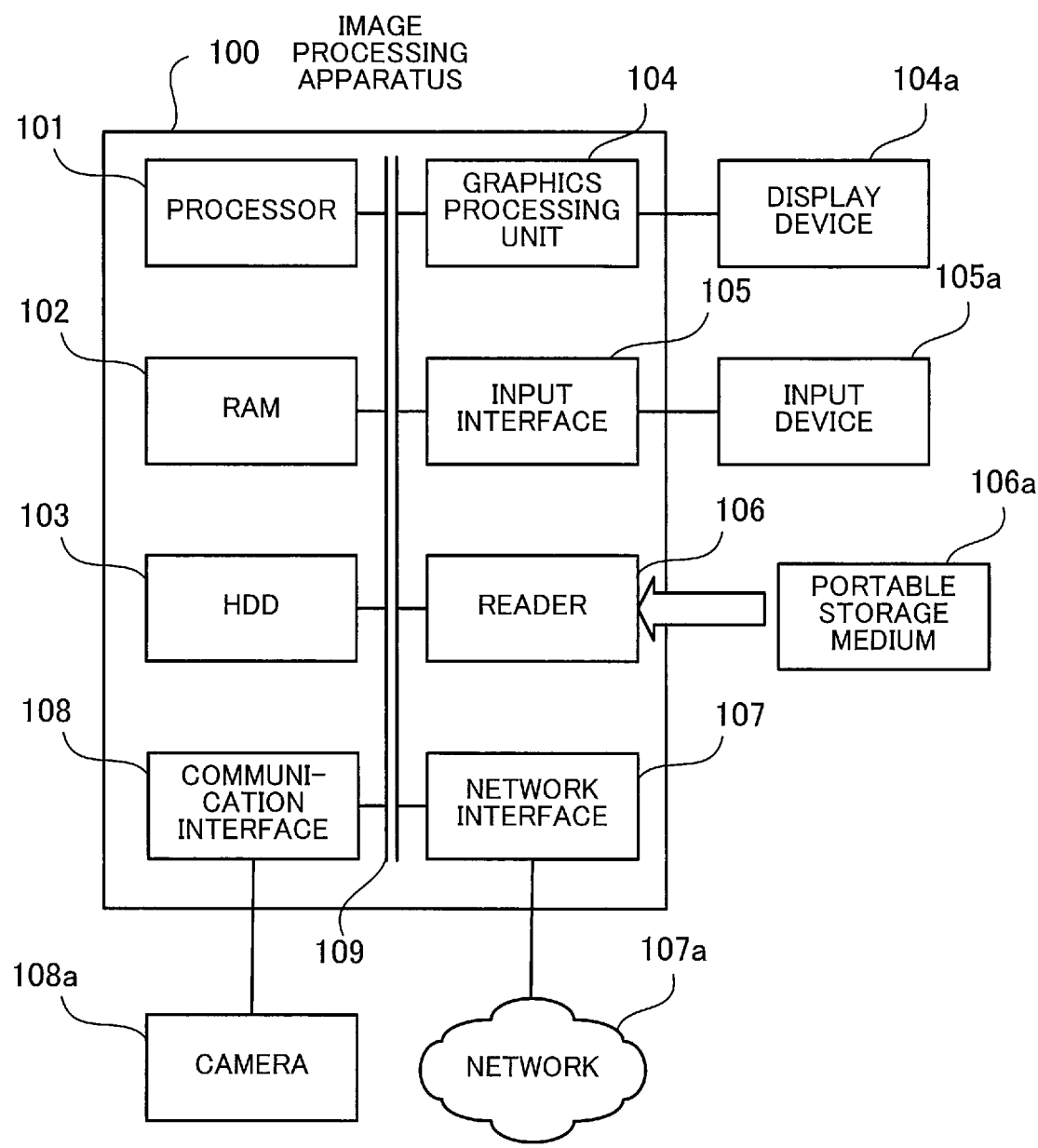
FIG. 7 illustrates an exemplary hardware configuration of an image processing apparatus.

FIG. 7 illustrates an exemplary hardware configuration of the image processing apparatus. An image processing apparatus 100 is implemented, for example, as a computer illustrated in FIG. 7.

The overall operation of the image processing apparatus 100 is controlled by a processor 101. The processor 101 may be a multiprocessor. Examples of the processor 101 include central processing unit (CPU), micro processing unit (MPU), digital signal processor (DSP), application specific integrated circuit (ASIC), and programmable logic device (PLD). Alternatively, the processor 101 may be a combination of two or more elements selected from CPU, MPU, DSP, ASIC, and PLD.

A random access memory (RAM) 102 and a plurality of peripheral devices are connected to the processor 101 via a bus 109.

The RAM 102 is used as a primary storage device of the image processing apparatus 100. The RAM 102 temporarily stores at least part of the operating system (OS) program and application programs that are executed by the processor 101. The RAM 102 also stores various types of data used for processing by the processor 101.

The peripheral devices connected to the bus 109 include an HDD 103, a graphics processing unit 104, an input interface 105, a reader 106, a network interface 107, and a communication interface 108.

The HDD 103 is used as a secondary storage device of the image processing apparatus 100. The HDD 103 stores the OS program, application programs, and various types of data. Note that other types of non-volatile storage devices such as SSD (Solid State Drive) and the like may be used as a secondary storage device.

A display device 104a is connected to the graphics processing unit 104. The graphics processing unit 104 displays an image on the screen of the display device 104a in accordance with an instruction from the processor 101. Examples of the display device include liquid crystal display, organic electro-luminescence display, and the like.

An input device 105a is connected to the input interface 105. The input interface 105 receives signals from the input device 105a, and transmits the received signals to the processor 101. Examples of the input device 105a include keyboard, pointing device, and the like. Examples of pointing devices include mouse, touch panel, tablet, touch pad, track ball, and the like.

A portable storage medium 106a is loaded into or removed from the reader 106. The reader 106 reads data stored in the portable storage medium 106a, and transmits the read data to the processor 101. Examples of the portable storage medium 106a include optical disc, magneto-optical disk, semiconductor memory device, and the like.

The network interface 107 transmits data to and receives data from other apparatuses via a network 107a.

The communication interface 108 transmits data to and receives data from an external device connected thereto. In this embodiment, a camera 108a is connected to the communication interface 108 as an external device. Thus, the communication interface 108 transmits, to the processor 101, image data transmitted from the camera 108a.

With the hardware configuration described above, it is possible to implement the processing functions of the image processing apparatus 100.

Figure 8:
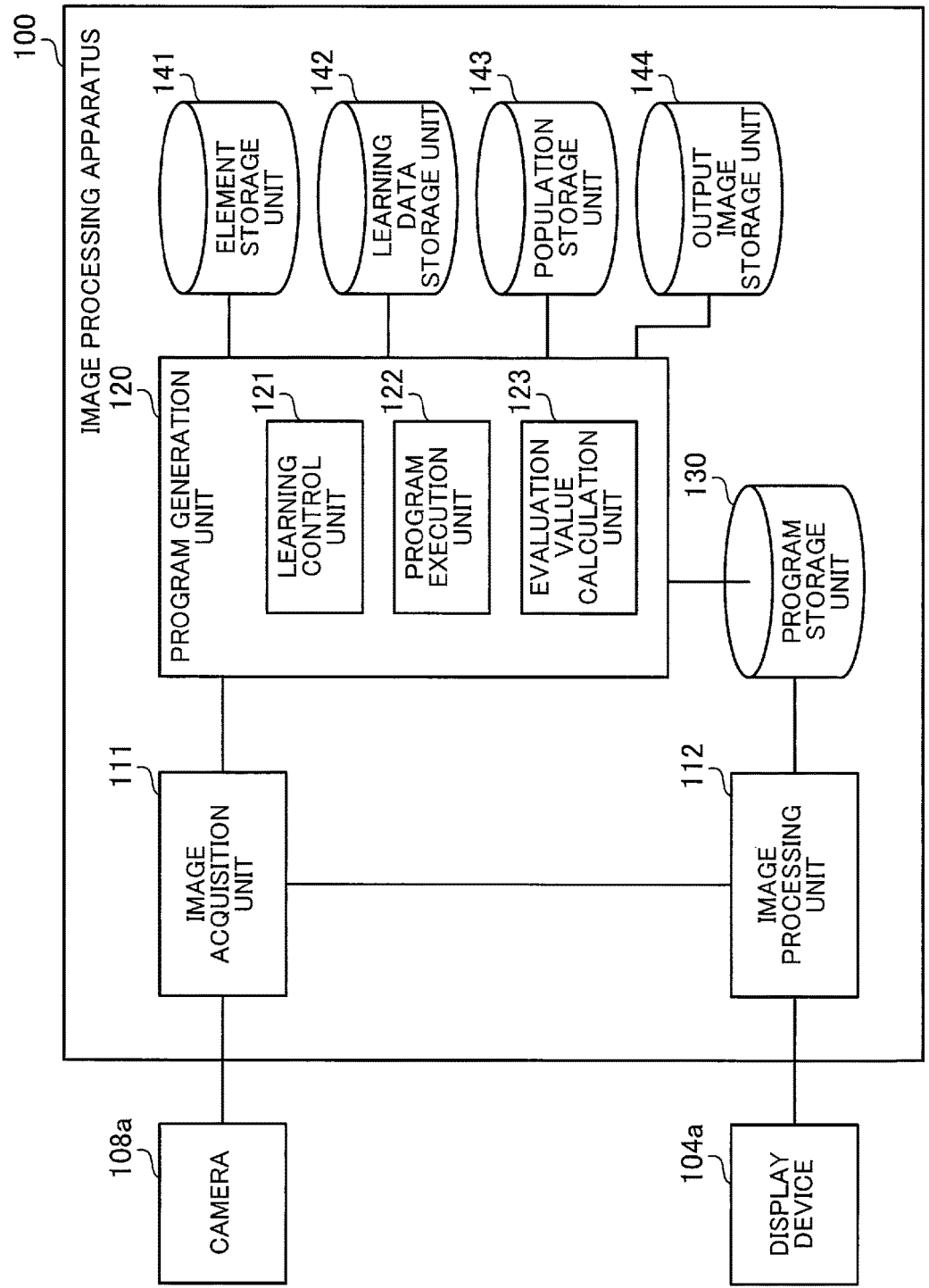
FIG. 8 is a block diagram illustrating an exemplary configuration of the processing functions of the image processing apparatus.

FIG. 8 is a block diagram illustrating an exemplary configuration of the processing functions of the image processing apparatus. The image processing apparatus 100 includes an image acquisition unit 111, an image processing unit 112, a program generation unit 120, a program storage unit 130, an element storage unit 141, a learning data storage unit 142, a population storage unit 143, and an output image storage unit 144.

Operations performed by the image acquisition unit 111, the image processing unit 112, and the program generation unit 120 are implemented, for example, by the processor 101 of the image processing apparatus 100 executing predetermined programs. Some of the operations performed by the image processing unit 112 are implemented, for example, by the processor 101 of the image processing apparatus 100 executing an image processing program stored in the program storage unit 130. The program storage unit 130, the element storage unit 141, and the learning data storage unit 142 are implemented, for example, as a storage area of the HDD 103 of the image processing apparatus 100. The population storage unit 143 and the output image storage unit 144 are implemented, for example, as a storage area of the RAM 102 of the image processing apparatus 100.

The image acquisition unit 111 acquires data of a captured image from the camera 108a, and outputs the data to the program generation unit 120 or the image processing unit 112.

The program generation unit 120 generates an image processing program by using genetic programming, and stores the generated image processing program in the program storage unit 130. The internal configuration of the program generation unit 120 will be described below.

The image processing unit 112 acquires data of an image captured by the camera 108a via the image acquisition unit 111. The image processing unit 112 performs image processing on the data of the acquired image in accordance with an image processing program stored in the program storage unit 130. The processed image is displayed, for example, on the display device 104a.

The program storage unit 130 stores the image processing program generated by the program generation unit 120.

The element storage unit 141 stores data of elements that may be incorporated into each individual generated by the program generation unit 120. These elements are partial programs that serve as the components of the image processing program, and include, for example, various types of image filtering programs.

The learning data storage unit 142 stores a plurality of sets of learning data, each including an input image, and its corresponding intermediate target image and final target image. The input image included in each set of learning data may be, for example, an image captured by the camera 108a connected to the image processing apparatus 100. Each of the intermediate target image and the final target image corresponding to the input image is generated by, for example, retouching the input image.

The population storage unit 143 stores a population. The population includes a plurality of individuals (image processing programs), each generated by combining the elements (partial programs) stored in the element storage unit 141. Note that the population storage unit 143 may store image processing programs corresponding to the respective individuals, or may store, for each individual, configuration information indicating the names of partial programs incorporated in the respective nodes of the individual, and the connection structure between the nodes. Further, the population storage unit 143 stores evaluation values calculated for the respective individuals, in association with the individuals.

The output image storage unit 144 stores output images obtained by executing a program corresponding to an individual subjected to survival selection. The output images include an intermediate output image that is output at an intermediate node of the individual, and a final output image that is output at a final node.

The program generation unit 120 includes a learning control unit 121, a program execution unit 122, and an evaluation value calculation unit 123.

The learning control unit 121 controls the entire program generation process performed by the program generation unit 120. For example, the learning control unit 121 performs operations such as generating an initial population, evolving an individual, performing survival selection based on evaluation values and outputting a final image processing program, creating a new population with a survived individual, and so on.

The program execution unit 122 executes an individual (image processing program), in response to an instruction from the learning control unit 121. Upon executing the individual, the program execution unit 122 outputs not only a final output image that is output at the final node of the individual, but also an intermediate output image that is output at an intermediate node of the individual, and stores the images in the output image storage unit 144.

The evaluation value calculation unit 123 calculates an evaluation value for evaluating each individual, in response to an instruction from the learning control unit 121. The evaluation value that is calculated includes not only the intermediate evaluation value and the final evaluation value described above, but also a comprehensive evaluation value.

In the following, an example of learning data will be described.

Figure 9:
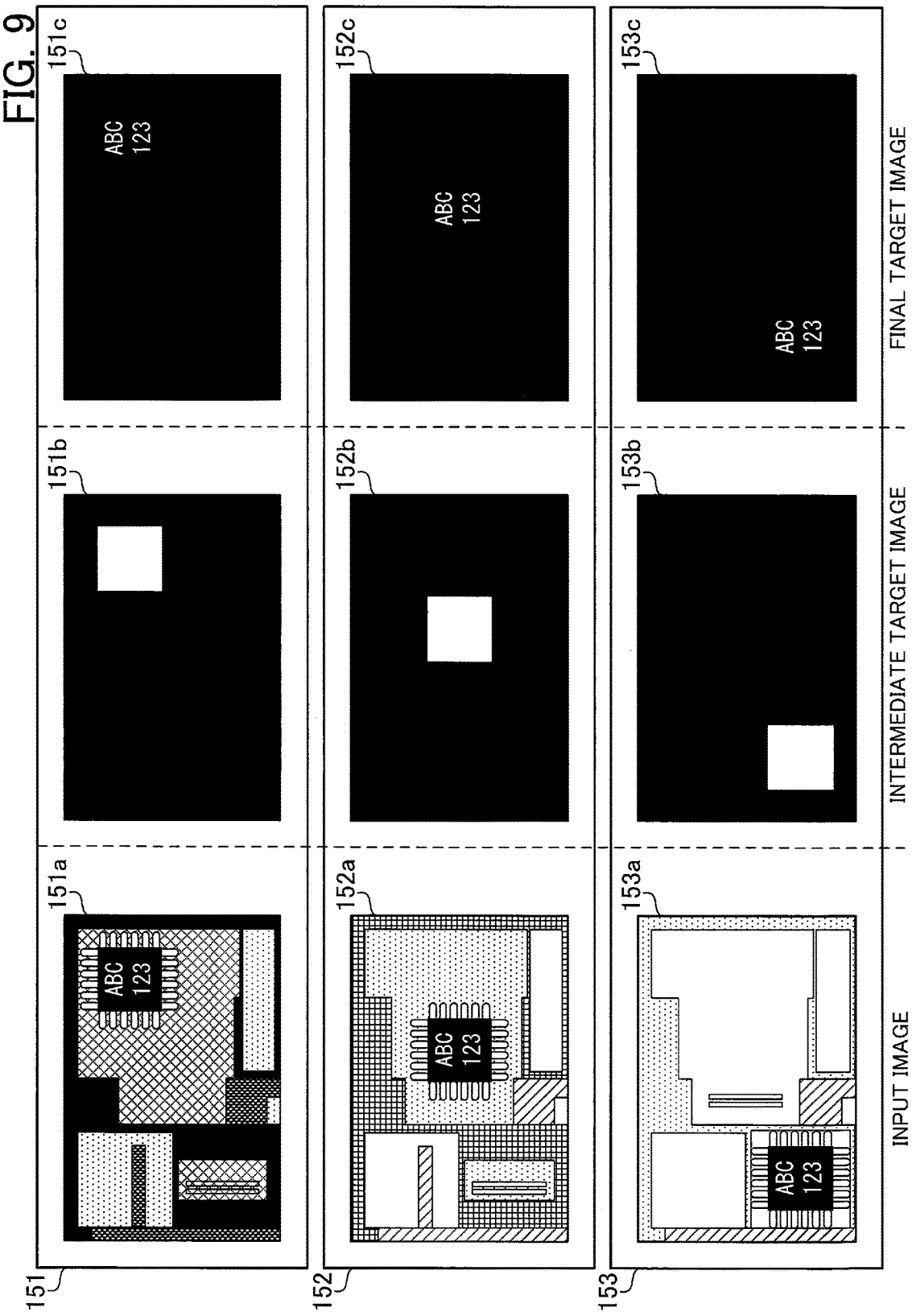
FIG. 9 illustrates a first example of learning data.

FIG. 9 illustrates a first example of learning data. In FIG. 9, for example, image processing is performed that extracts, from a package region of a semiconductor chip mounted on a printed circuit board, only the portion of text printed in the region as a white region. In this case, the extraction target region from which text is extracted is the package region of a semiconductor chip. In order to generate an image processing program for implementing such image processing using the image processing apparatus 100, sets of learning data 151 to 153 illustrated in FIG. 9 are used, for example.

The learning data 151 includes an input image 151a, an intermediate target image 151b, and a final target image 151c. The input image 151a displays a printed circuit board. The intermediate target image 151b is a mask image in which a background region other than a package region of a semiconductor chip (extraction target region) in the input image 151a is masked. The final target image 151c is an image in which only the portion of text printed in the package region of the semiconductor chip in the input image 151a is white.

The learning data 152 includes an input image 152a, an intermediate target image 152b, and a final target image 152c. The input image 152a displays a printed circuit board. The printed circuit board in the input image 152a may be different from the printed circuit board in the input image 151a. Further, the mounting position of the semiconductor chip in the input image 152a may be different from the mounting position of the semiconductor chip in the input image 151a. The intermediate target image 152b is a mask image in which a background region in the input image 152a is masked. The final target image 152c is an image in which only the portion of text printed in the package region of the semiconductor chip in the input image 152a is white.

The learning data 153 includes an input image 153a, an intermediate target image 153b, and a final target image 153c. The input image 153a displays a printed circuit board. The printed circuit board in the input image 153a may be different from the printed circuit boards in the input images 151a and 152a. Further, the mounting position of the semiconductor chip in the input image 153a may be different from the mounting positions of the semiconductor chips in the input images 151a and 152a. The intermediate target image 153b is a mask image in which a background region in the input image 153a is masked. The final target image 153c is an image in which only the portion of text printed in the package region of the semiconductor chip in the input image 153a is white.

Figure 10:
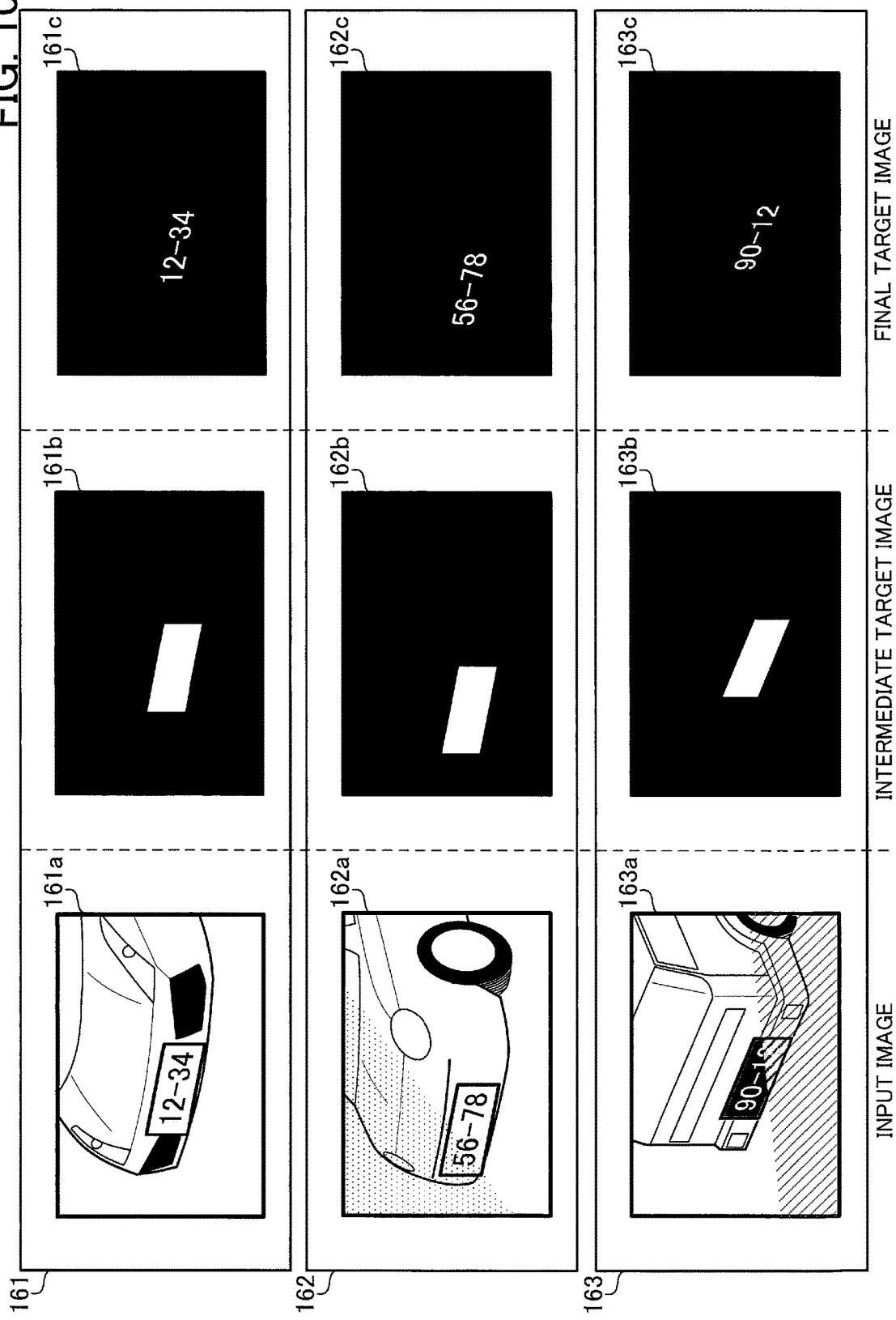
FIG. 10 illustrates a second example of learning data.

FIG. 10 illustrates a second example of learning data. In FIG. 10, for example, image processing is performed that extracts, from the region of a license plate attached to a vehicle traveling on the road, only the portion of text printed in the region as a white region. In this case, the extraction target region from which text is extracted is the license plate region. In order to generate an image processing program for implementing such image processing using the image processing apparatus 100, sets of learning data 161 to 163 illustrated in FIG. 10 are used, for example.

The learning data 161 includes an input image 161a, an intermediate target image 161b, and a final target image 161c. The input image 161a displays a vehicle. The intermediate target image 161b is a mask image in which a background region other than a license plate region (extraction target region) in the input image 161a is masked. The final target image 161c is an image in which only the portion of text contained in the license plate region in the input image 161a is white.

The learning data 162 includes an input image 162a, an intermediate target image 162b, and a final target image 162c. The input image 162a displays a vehicle. The vehicle in the input image 162a may be different from the vehicle in the input image 161a. Further, the position of the license plate in the input image 162a may be different from the position of the license plate in the input image 161a. The intermediate target image 162b is a mask image in which a background region in the input image 162a is masked. The final target image 162c is an image in which only the portion of text printed in the license plate region in the input image 162a is white.

The learning data 163 includes an input image 163a, an intermediate target image 163b, and a final target image 163c. The input image 163a displays a vehicle. The vehicle in the input image 163a may be different from the vehicles in the input images 161a and 162a. Further, the position of the license plate in the input image 163a may be different from the positions of the license plates in the input images 161a and 162a. The intermediate target image 163b is a mask image in which a background region in the input image 163a is masked. The final target image 163c is an image in which only the portion of text contained in the license plate region in the input image 163a is white.

As in the examples of FIGS. 9 and 10 described above, when generating an image processing program, it is preferable to use a plurality of sets of learning data that differ in the position of the extraction target region. Thus, even when image processing is performed on captured images that differ in the position of the extraction target region, it is possible to create an image processing program capable of efficiently achieving the desired result.

Further, the input images 151*a*, 152*a*, and 153*a* of FIG. 9 differ in the brightness of illumination on the object at the time of imaging. The input images 161*a*, 162*a*, and 163*a* of FIG. 10 differ in the distribution of light illuminating the object at the time of imaging. As in these examples, when generating an image processing program, it is preferable to use a plurality of sets of learning data including input images that differ in imaging conditions such as brightness and the like. Thus, it is possible to generate an image processing program capable of stably achieving the desired result even in the case where the imaging conditions vary.

In the following, the image processing program generation process performed by the image processing apparatus 100 will be described in detail with reference to a flowchart.

Figure 11:
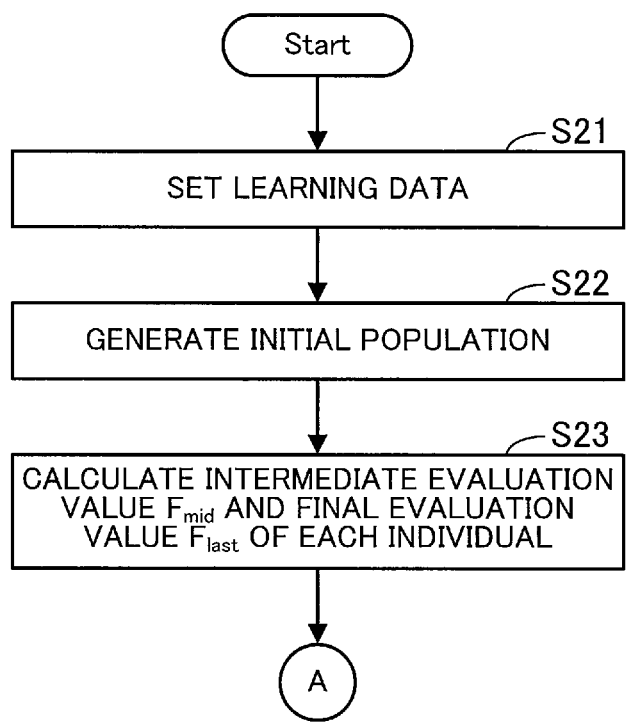
FIG. 11 is a flowchart (part 1) illustrating an example of a procedure for a program generation process.
Figure 12:
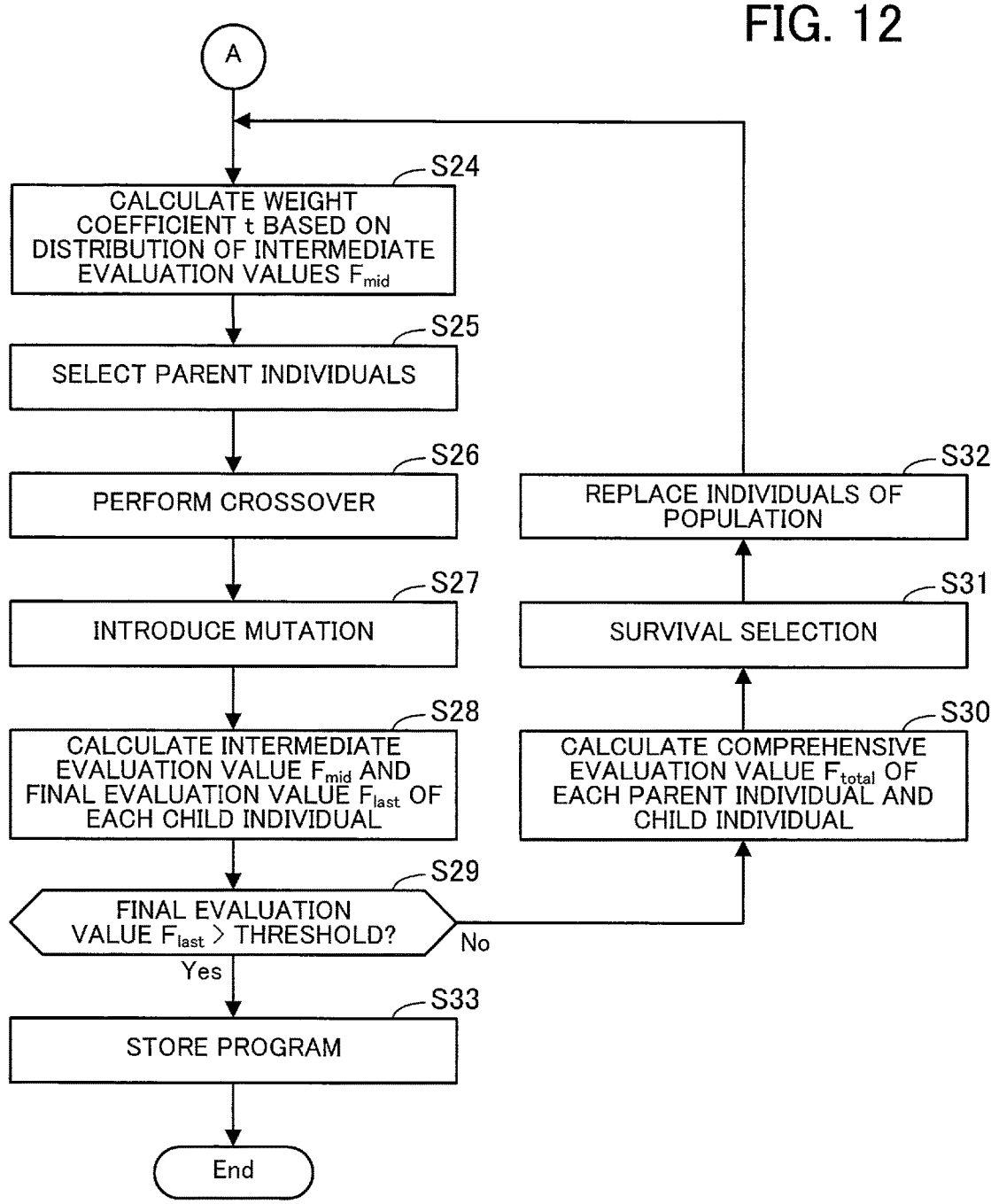
FIG. 12 is a flowchart (part 2) illustrating the example of a procedure for a program generation process.

FIGS. 11 and 12 are flowcharts illustrating an example of a procedure for the program generation process.

(Step S21) The learning control unit 121 receives an input operation for specifying learning data. For example, a set of learning data to be used in this process is specified from among the sets of learning data stored in the learning data storage unit 142. In this example, n sets of learning data are used (n is an integer greater than or equal to 1).

(Step S22) The learning control unit 121 generates a plurality of initial individuals by combining the elements registered in the element storage unit 141, and stores the generated initial individuals in the population storage unit 143. A population generated by this operation corresponds to the population 61 of FIG. 3, and therefore is hereinafter referred to as the "population 61".

(Step S23) An intermediate evaluation value $F_{mid}$ and a final evaluation value $F_{last}$ of each individual included in the population 61 are calculated with the following procedure.

The learning control unit 121 selects one of the individuals included in the population 61, and causes the program execution unit 122 to execute the selected individual. The program execution unit 122 performs image processing on each input image included in the n sets of learning data specified in step S21, in accordance with the selected individual. In this image processing, the program execution unit 122 stores images that are output from the nodes of the selected individual, in the output image storage unit 144. The stored output images include an intermediate output image that is output at an intermediate node, and a final output image that is output at the final node. That is, for each of the n sets of learning data, one or more intermediate output images and one final output image are stored.

The learning control unit 121 causes the evaluation value calculation unit 123 to calculate an intermediate evaluation value $F_{mid}$ and the final evaluation value $F_{last}$ of the selected individual. The evaluation value calculation unit 123 first calculates a preliminary evaluation value for each intermediate node included in the individual. More specifically, a preliminary evaluation value f(k) of a k-th intermediate node included in the individual is calculated in accordance with the following equation (1), using n intermediate output images that are output at the k-th intermediate node based on the n sets of learning data, respectively.

$$f(k) = \frac{1}{n}\sum_{t=1}^{n}\left\{1 - \frac{1}{W \cdot H}\sum_{(x,y)}\frac{|m_{(k,i)}(x, y) - M_i(x, y)|}{V_{max}}\right\} \quad (1)$$

where W represents the number of pixels in the horizontal direction of the image; H represents the number of pixels in the perpendicular direction of the image; $m_{(k,i)}(x, y)$ represents the pixel value at coordinates (x, y) in an intermediate output image that is output at the k-th intermediate node, using an input image included in an i-th learning data; $M_i(x, y)$ represents the pixel value at coordinates (x, y) in an intermediate target image included in the i-th learning data; and $V_{max}$ represents the possible maximum pixel value. Note these pixel values are, for example, luminance values. According to equation (1), the preliminary evaluation value f(k) takes a value greater than or equal to 0 and less than or equal to 1.

The evaluation value calculation unit 123 calculates preliminary evaluation values f(k) of all the intermediate nodes included in the individual in the manner described above. Then, the evaluation value calculation unit 123 calculates an intermediate evaluation value $F_{mid}$ corresponding to the individual in accordance with the following equation (2). More specifically, the intermediate evaluation value $F_{mid}$ corresponding to the individual is calculated as the maximum value among the preliminary evaluation values f(k) calculated for the individual.

$$F_{mid} = \max\{f(k)\} \quad (2)$$

Further, the evaluation value calculation unit 123 calculates a final evaluation value $F_{last}$ in accordance with the following equation (3), using n final output images that are output at the final node of the individual based on the n sets of learning data, respectively.

$$F_{last} = \frac{1}{n}\sum_{t=1}^{n}\left\{1 - \frac{1}{W \cdot H}\sum_{(x,y)}\frac{|o_i(x, y) - T_i(x, y)|}{V_{max}}\right\} \quad (3)$$

where $o_i(x, y)$ represents the pixel value at coordinates (x, y) in a final output image that is output using an input image included in the i-th learning data; and $T_i(x, y)$ represents the pixel value at coordinates (x, y) in a final target image that is included in the i-th learning data. According to equation (3), similar to the preliminary evaluation value f(k), the final evaluation value $F_{last}$ takes a value greater than or equal to 0 and less than or equal to 1.

With the procedure described above, an intermediate evaluation value $F_{mid}$ and a final evaluation value $F_{last}$ are calculated for each individual included in the population 61. The evaluation value calculation unit 123 registers the calculated intermediate evaluation value $F_{mid}$ and the final evaluation value $F_{last}$, in association with the individual, in the population storage unit 143.

(Step S24) The learning control unit 121 instructs the evaluation value calculation unit 123 to calculate a weight coefficient t. The evaluation value calculation unit 123 calculates the weight coefficient t, based on the distribution of the intermediate evaluation values $F_{mid}$ of all the individuals included in the current population 61. For example, the weight coefficient t is calculated as the average value of the intermediate evaluation values $F_{mid}$ of all the individuals included in the population 61.

(Step S25) The learning control unit 121 randomly selects two parent individuals from among the individuals included in the population 61.

(Step S26) The learning control unit 121 performs a crossover between the two selected parent individuals to thereby generate a predetermined number of, two or more, child individuals.

(Step S27) The learning control unit 121 introduces a mutation into a node of one of the generated child individuals to replace an image filter incorporated in the original child node with another image filter registered in the element storage unit 141.

(Step S28) An intermediate evaluation value $F_{mid}$ and a final evaluation value $F_{last}$ of each child individual generated by the operations of steps S26 and S27 are calculated with the same procedure as that used for calculating the intermediate evaluation value $F_{mid}$ and the final evaluation value $F_{last}$ of the individual in step S23.

(Step S29) The learning control unit 121 compares the final evaluation value $F_{last}$ of each of the parent individuals selected in step S25 and the individuals generated in steps S26 and S27 with a predetermined threshold. The learning control unit 121 determines whether there is an individual whose final evaluation value $F_{last}$ is greater than the threshold. If there is no individual whose final evaluation value $F_{last}$ is greater than the threshold, the process moves to step S30. If there is an individual whose final evaluation value $F_{last}$ is greater than the threshold, the process moves to step S33.

(Step S30) The learning control unit 121 causes the evaluation value calculation unit 123 to calculate a comprehensive evaluation value $F_{total}$ of each of the parent individuals selected in step S25 and the child individuals generated in steps S26 and S27. The evaluation value calculation unit 123 calculates the comprehensive evaluation value $F_{total}$ of each of these individuals, in accordance with the following equation (4).

$$F_{total} = (1-t)F_{mid} + tF_{last} \quad (4)$$

(Step S31) The learning control unit 121 selects the individual having the highest comprehensive evaluation value $F_{total}$ among those calculated in step S30 as an individual to be preserved, from among the parent individuals selected in step S25 and the child individuals generated in steps S26 and S27. Further, the learning control unit 121 selects another individual to be preserved, from among the remaining individuals. In this selection operation, for example, an individual is selected in accordance with the probabilities based on the calculated comprehensive evaluation values $F_{total}$.

(Step S32) The learning control unit 121 replaces, among the individuals included in the population 61, the parent individuals selected in step S25 with the two individuals selected in step S31. Thus, a new generation of the population 61 is created. Further, the intermediate evaluation values $F_{mid}$ and the final evaluation values $F_{last}$ of the two individuals selected in step S31 are registered, in association with the individuals, in the population storage unit 143.

Note that at least one of the individuals of the population 61 that are replaced may be, for example, the individual having the lowest comprehensive evaluation value $F_{total}$ or the lowest final evaluation value $F_{last}$.

(Step S33) The learning control unit 121 stores an image processing program corresponding to the individual that is determined to have a final evaluation value $F_{last}$ greater than the threshold in step S29, in the program storage unit 130. Then, the process ends. Note that if, in step S29, there are a plurality of individuals having a final evaluation value $F_{last}$ greater than the threshold, the learning control unit 121 stores an image processing program corresponding to the individual having the highest final evaluation value $F_{last}$ among these individuals, in the program storage unit 130.

According to the process illustrated in FIGS. 11 and 12, in step S30, the comprehensive evaluation value $F_{total}$ of each individual to be subjected to survival selection is calculated based on the intermediate evaluation value $F_{mid}$ and the final evaluation value $F_{last}$ of the individual. Then, in step S31, an individual to be preserved is selected based on the comprehensive evaluation value $F_{total}$. Thus, an individual to be preserved is selected based not only on the final output image that is output as the result of image processing by each individual, but also on the effectiveness of the intermediate output image that is output halfway through the image processing. Therefore, an individual a part of whose processing process is determined to be appropriate is more likely to survive in the population 61 without being eliminated. Then, as the number of such individuals increases in the population 61, the maximum value among the final evaluation values $F_{last}$ of the individuals of the population 61 is more likely to increase. Accordingly, the learning speed is improved, and the time taken to complete generation of an image processing program is reduced.

Further, after a new generation of the population 61 is created in step S32, the weight coefficient t used for calculating the comprehensive evaluation value $F_{total}$ is calculated again in step S24, based on the distribution of the intermediate evaluation values $F_{mid}$ of the respective individuals of the population 61 of that generation. Accordingly, the comprehensive evaluation value $F_{total}$ varies as learning progresses.

Since the weight coefficient t is calculated based on the distributions of the intermediate evaluation values $F_{mid}$ of the respective individuals of the population 61, the value of the weight coefficient t gradually increases as learning progresses. Therefore, upon calculating the comprehensive evaluation value $F_{total}$, the synthesis ratio of the final evaluation value $F_{last}$ increases as learning progresses. Thus, in the initial stage of learning, survival selection of individuals is performed with a focus on the intermediate evaluation value $F_{mid}$. Then, as learning progresses, survival selection of individuals is performed with a focus on the final evaluation value $F_{last}$. As the number of individuals having a high intermediate evaluation value $F_{mid}$ increases in the population 61, the time taken for the final evaluation value $F_{last}$ to reach the predetermined threshold is reduced. Therefore, by varying the weight coefficient as described above, the time taken to complete generation of an image processing program is reduced as a whole.

Figure 13:
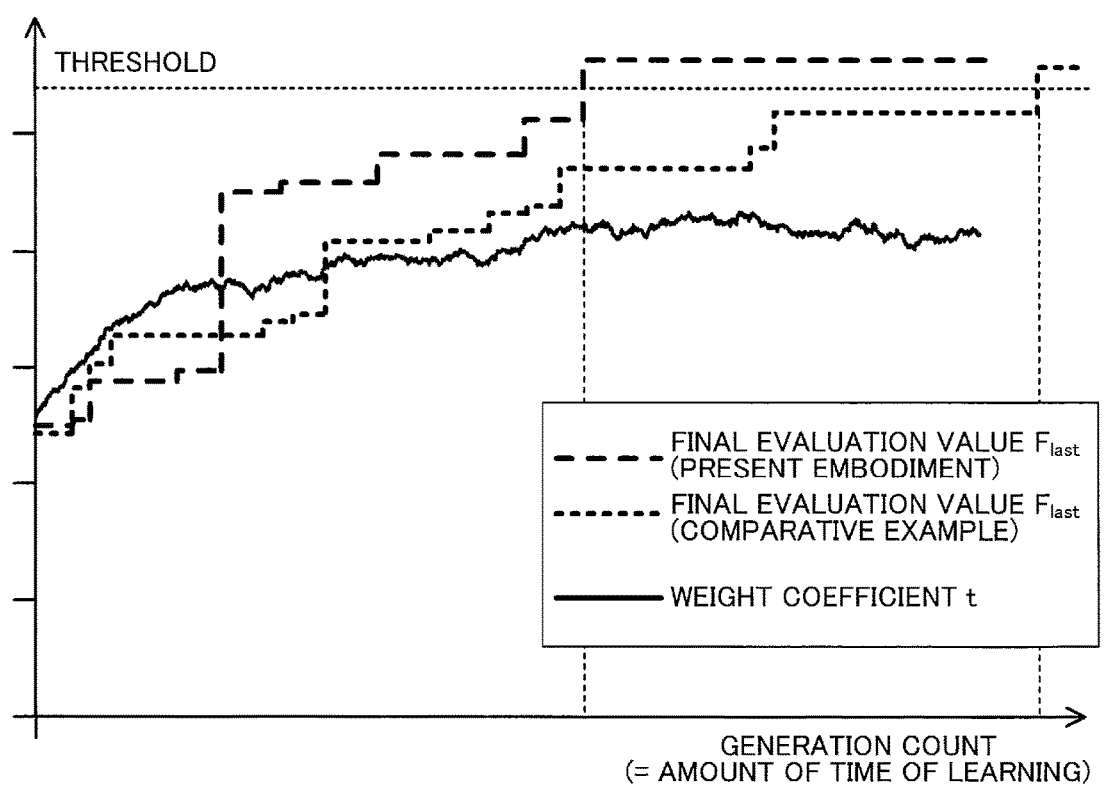
FIG. 13 illustrates an example of changes in final evaluation value and weight coefficient.

FIG. 13 illustrates an example of changes in final evaluation value and weight coefficient. FIG. 13 illustrates changes in the final evaluation value $F_{last}$ in the present embodiment, together with a comparative example of changes in the final evaluation value $F_{last}$ in the case where survival selection is performed based on the final evaluation value $F_{last}$, in place of the comprehensive evaluation value $F_{total}$, in step S30 of FIG. 12. Note that the final evaluation value $F_{last}$ indicated in FIG. 13 is the maximum value among the final evaluation values $F_{last}$ that are compared with the threshold in step S29 of FIG. 12.

According to the example of FIG. 13, the time take for the final evaluation value $F_{last}$ to exceed the predetermined threshold in the present embodiment is reduced to about a half compared to the comparative example. Further, the weight coefficient t generally increases as the generation count of the population 61 increases.

Third Embodiment

A third embodiment illustrates a modification of the second embodiment, in which the weight coefficient t is calculated based on the temporal progress of learning, instead of calculating the weight coefficient t based on the calculated intermediate evaluation value $F_{mid}$. Note that the basic configuration of an image processing apparatus of the third embodiment is the same as that of the second embodiment, and will be described using the same reference signs as those used in the second embodiment.

Figure 14:
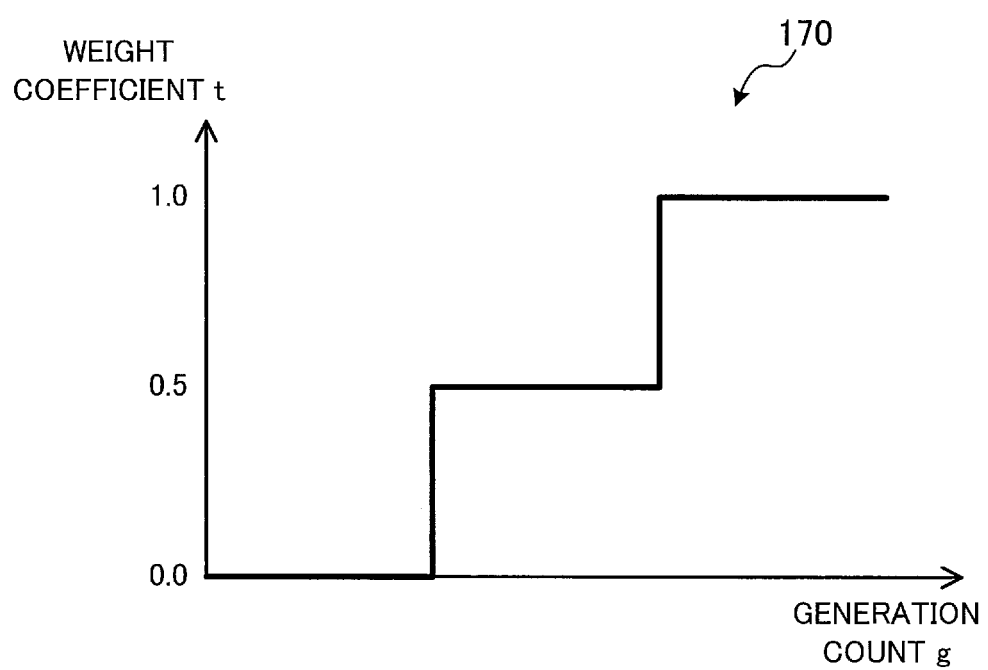
FIG. 14 is a diagram for explaining a modulation table used for calculation of a weight coefficient.

FIG. 14 is a diagram for explaining a modulation table used for calculation of a weight coefficient. A graph 170 of FIG. 14 represents graphically the information registered in the modulation table. In the example of the graph 170, the weight coefficient t increases at three stages as a generation count g of the population 61 increases. The image processing apparatus 100 of the present embodiment calculates the weight coefficient t, based on the modulation table storing the corresponding relationship between the generation count g and the weight coefficient t illustrated in the graph 170.

Note that the method of calculating the weight coefficient t is not limited to the method using the modulation table, and may be any method as long as the weight coefficient t increases as learning progresses. For example, the weight coefficient t may be calculated using a predetermined calculation formula.

Figure 15:
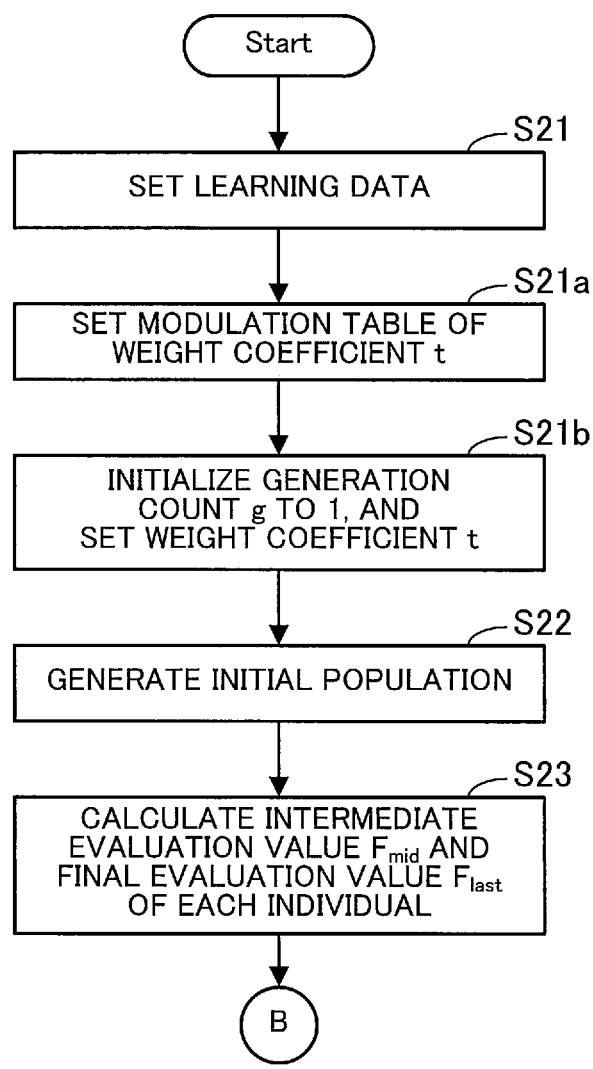
FIG. 15 is a flowchart (part 1) illustrating an example of a procedure for a program generation process according to a third embodiment.
Figure 16:
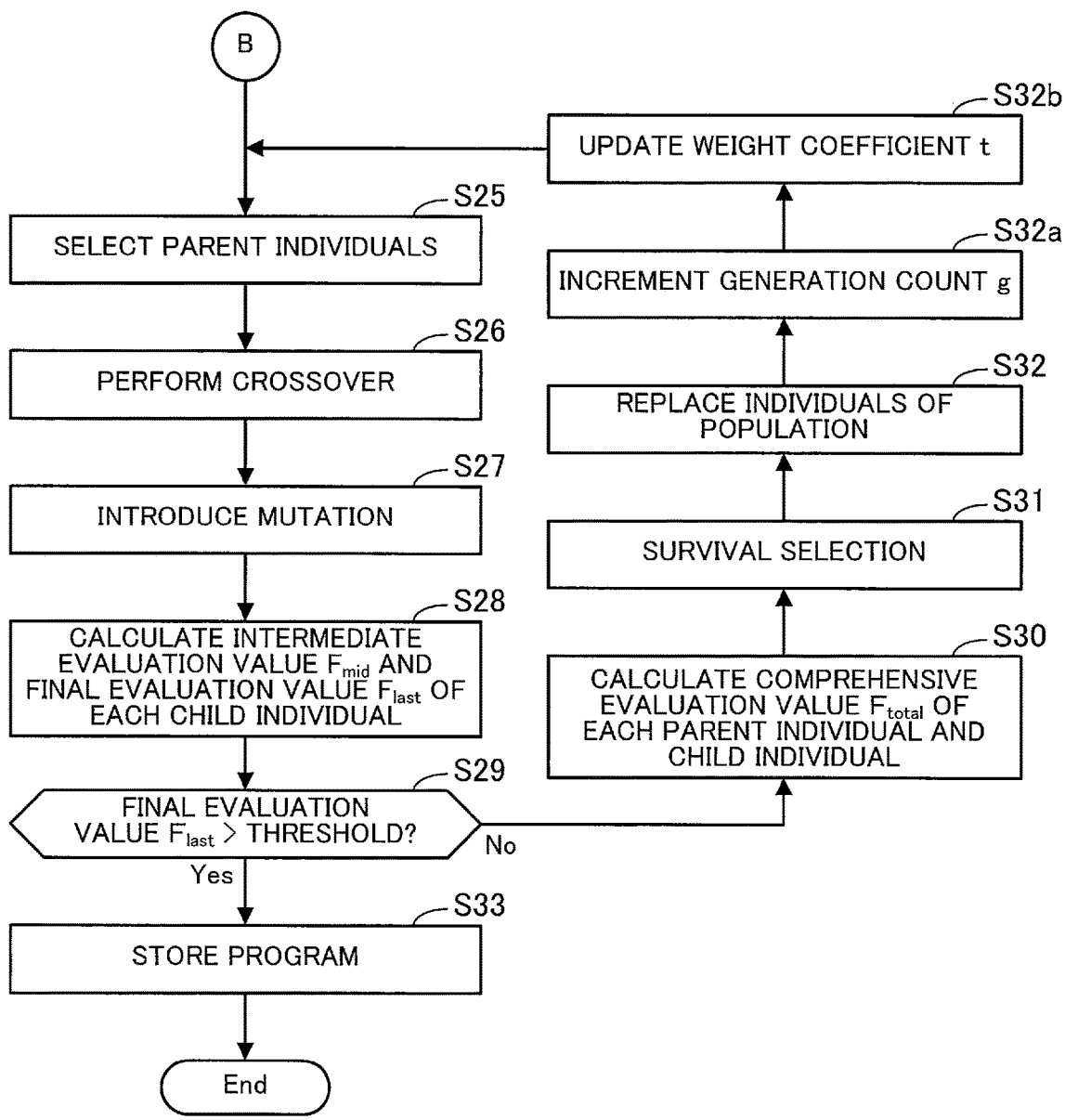
FIG. 16 is a flowchart (part 2) illustrating the example of a procedure for a program generation process according to the third embodiment.

FIGS. 15 and 16 are flowcharts illustrating an example of a procedure for a program generation process according to the third embodiment. Note that, in FIGS. 15 and 16, the same steps as those of FIGS. 11 and 12 are indicated by the same step numbers, and will not be described herein.

The process of FIGS. 15 and 16 is different from the process of FIGS. 11 and 12 in the following respects. Steps S21a and S21b are added between step S21 and step S22. Further, the operation of step S24 is eliminated, so that step S23 is followed by step S25. Further, steps S32a and S32b are added after step S32, so that step S32b is followed by step S25.

(Step S21a) The learning control unit 121 sets the modulation table of the weight coefficient t. For example, the correspondence relationship between the generation count g and the weight coefficient t is specified by an input operation by the user.

(Step S21b) The learning control unit 121 initializes the generation count g to 1, and instructs the evaluation value calculation unit 123 to set the weight coefficient t. The evaluation value calculation unit 123 refers to the modulation table, and sets a value of the weight coefficient t associated with the current generation number g.

(Step S32a) The learning control unit 121 increments the generation count g by one.

(Step S32b) The learning control unit 121 instructs the evaluation value calculation unit 123 to update the weight coefficient t. The evaluation value calculation unit 123 refers to the modulation table, and updates the setting value of the current weight coefficient t, using the value of the weight coefficient t associated with the current generation number g.

The operation of step S21b may be performed at any time point after completion of step S21a and before execution of step S30. Further, the operations of steps S32a and S32b may be performed at any time point after completion of step S32 and before execution of step S30.

According to the third embodiment described above, the value of the weight coefficient t gradually increases as learning progresses. Thus, in the initial stage of learning, survival selection of individuals is performed with a focus on the intermediate evaluation value $F_{mid}$. Then, as learning progresses, survival selection of individuals is performed with a focus on the final evaluation value $F_{last}$. Accordingly, the time taken to complete generation of an image processing program is reduced.

Note that the processing functions of each of the apparatuses (the program generation apparatus 1 and the image processing apparatus 100) of the above embodiments may be implemented on a computer. In this case, a program describing operations of the functions of each apparatus is provided. When the program is executed by a computer, the above-described processing functions are implemented on the computer. The program describing operations of the functions may be stored in a computer-readable storage medium. Examples of computer-readable storage media include magnetic storage device, optical disc, magneto-optical storage medium, semiconductor memory device, and the like. Examples of magnetic storage devices include hard disk drive (HDD), flexible disk (FD), magnetic tape, and the like. Examples of optical discs include digital versatile disc (DVD), DVD-RAM, compact disc read only memory (CD-ROM), CD-Recordable (CD-R), CD-Rewritable (CD-RW), and the like. Examples of magneto-optical storage media include magneto-optical disk (MO) and the like.

For distributing the program, the program may be stored and sold in the form of a portable storage medium such as DVD, CD-ROM, and the like, for example. The program may also be stored in a storage device of a server computer, and transferred from the server computer to other computers via a network.

For executing the program on a computer, the computer stores the program recorded on the portable storage medium or the program transmitted from the server computer in its storage device. Then, the computer reads the program from its storage device, and performs processing in accordance with the program. The computer may read the program directly from the portable storage medium, and execute processing in accordance with the program. Further, the computer may sequentially receive the program from a server computer connected over a network, and perform processing in accordance with the received program.

According to one aspect, it is possible to perform appropriate survival selection when generating an image processing program by using genetic programming.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A program generation apparatus that generates a program by using genetic programming, the program generation apparatus comprising:
   a memory configured to store learning data including an input image and a first target image, the first target image indicating an image that is output halfway through a process of converting the input image into a second target image; and
   a processor configured to perform a procedure including:
     selecting a first program from among a plurality of image processing programs each generated by combining a plurality of partial programs,
     generating a second program by changing a part of the partial programs included in the first program,
     performing image processing on the input image using the second program, determining whether to pass the second program to a next generation, based on a comparison between one or more intermediate output images and the first target image, the one or more intermediate output images being output halfway through the image processing, and replacing one of the plurality of image processing programs with the second program when the second program is determined to be passed to the next generation.

2. The program generation apparatus according to claim 1, wherein:

the performing includes executing non-final partial programs from among the partial programs included in the second program, the non-final partial programs being incorporated in positions other than a final stage, and outputting the intermediate output images for the respective non-final partial programs; and the determining includes calculating evaluation values for the respective non-final partial programs, based on a comparison between each of the intermediate output images that are output for the respective non-final partial programs and the first target image, and determining whether to pass the second program to the next generation, based on a maximum value among the evaluation values.

3. The program generation apparatus according to claim 1, wherein:

the procedure further includes performing processes on the input image using the respective image processing programs, and calculating a weight coefficient based on a comparison between each of images that are output halfway through the respective processes and the first target image; and the determining includes calculating a first evaluation value based on the comparison between the one or more intermediate output images and the first target image, calculating a second evaluation value based on a comparison between a final output image and the second target image, the final output image being output as a result of the image processing, and determining whether to pass the second program to the next generation, based on a third evaluation value obtained by synthesizing the first evaluation value and the second evaluation value at a ratio corresponding to the weight coefficient.

4. The program generation apparatus according to claim 1, wherein:

the procedure further includes calculating a weight coefficient, based on a number of times of generation change of a population that includes the plurality of image processing programs as individuals of a current generation; and the determining includes calculating a first evaluation value based on the comparison between the one or more intermediate output images and the first target image, calculating a second evaluation value based on a comparison between a final output image and the second target image, the final output image being output as a result of the image processing, and determining whether to pass the second program to the next generation, based on a third evaluation value obtained by synthesizing the first evaluation value and the second evaluation value at a ratio corresponding to the weight coefficient.

5. The program generation apparatus according to claim 1, wherein:

the first target image is an image obtained by distinguishing between a first image region on which specific processing is performed and a second image region other than the first image region in the input image; and the second target image is an image obtained by performing the specific processing on the first image region of the input image.

6. A program generation method for generating a program by using genetic programming, the program generation method comprising:

selecting, by a processor, a first program from among a plurality of image processing programs each generated by combining a plurality of partial programs;

generating, by the processor, a second program by changing a part of the partial programs included in the first program;

performing, by the processor, image processing on an input image using the second program;

determining, by the processor, whether to pass the second program to a next generation, based on a comparison between one or more intermediate output images and a first target image, the one or more intermediate output images being output halfway through the image processing, the first target image indicating an image that is output halfway through a process of converting the input image into a second target image; and replacing, by the processor, one of the plurality of image processing programs with the second program when the second program is determined to be passed to the next generation.

7. A non-transitory computer-readable storage medium storing a computer program for generating a program by using genetic programming, the computer program causing a computer to perform a procedure comprising:

selecting a first program from among a plurality of image processing programs each generated by combining a plurality of partial programs;

generating a second program by changing a part of the partial programs included in the first program;

performing image processing on an input image using the second program;

determining whether to pass the second program to a next generation, based on a comparison between one or more intermediate output images and a first target image, the one or more intermediate output images being output halfway through the image processing, the first target image indicating an image that is output halfway through a process of converting the input image into a second target image; and replacing one of the plurality of image processing programs with the second program when the second program is determined to be passed to the next generation.

* * * * *